US006635814B2

(12) United States Patent
Antaki

(10) Patent No.: US 6,635,814 B2
(45) Date of Patent: *Oct. 21, 2003

(54) ENHANCED HARMONICA

(76) Inventor: James F. Antaki, 4373 Mt. Royal Blvd., Pittsburgh, PA (US) 15101

( * ) Notice: Subject to any disclaimer, the term of this patent is extended or adjusted under 35 U.S.C. 154(b) by 15 days.

This patent is subject to a terminal disclaimer.

(21) Appl. No.: 10/058,880

(22) Filed: Jan. 28, 2002

(65) Prior Publication Data

US 2002/0069745 A1 Jun. 13, 2002

Related U.S. Application Data

(63) Continuation of application No. 09/496,816, filed on Feb. 2, 2000, now Pat. No. 6,359,204.

(51) Int. Cl.[7] .................................................. G01D 7/12
(52) U.S. Cl. ........................................................ 84/377
(58) Field of Search .......................... 84/377, 378, 379

(56) References Cited

U.S. PATENT DOCUMENTS

| | | | |
|---|---|---|---|
| 574,625 | A | 1/1897 | Paris |
| 1,671,309 | A | 5/1928 | Newman |
| 1,752,988 | A | 4/1930 | Haussler |
| 2,005,443 | A | 6/1935 | Steele |
| 2,339,790 | A | 1/1944 | Magnus |
| 2,407,312 | A | 9/1946 | Magnus |
| 2,592,220 | A | 4/1952 | Wetzler |
| 2,595,316 | A | 5/1952 | Wetzler |
| 2,675,727 | A | 4/1954 | Beker et al. |
| 5,367,937 | A | 11/1994 | Epping |
| 5,377,574 | A | 1/1995 | Lempke |
| 5,739,446 | A | 4/1998 | Bahnson |
| 5,967,187 | A | 10/1999 | Horne et al. |

FOREIGN PATENT DOCUMENTS

| | | |
|---|---|---|
| DE | 3521118 | 12/1986 |
| EP | 642604 | 9/1950 |

*Primary Examiner*—Shih-Yung Hsieh
(74) *Attorney, Agent, or Firm*—William F. Lang, IV; David V. Radack; Eckert Seamans Cherin & Mellott, LLC

(57) ABSTRACT

Harmonica structures designed for enhancing harmonica play are disclosed. In one aspect, a reed comb is provided with a common bridge having reeds formed integrally therewith. The reed plate has a plurality of reed slots formed therein and is adapted to receive the reeds of the reed comb into corresponding slots formed in the reed plate. A stepped portion formed in the reed plate is adapted to receive a reed of the reed comb therein to permit substantial encasement of the reed within the reed slot. A key benefit of this arrangement is to resist leakage of air between the reed plate and the flanks of the reed during harmonica play. The reed plate can also include a first stepped portion upon which the roots of the reeds are positioned and a second stepped portion positioned adjacent to the tips of the reeds. Other structures are disclosed that include a radiused surface formed on a portion of the reed or on the surface of the reed slot in which the reed is positioned. A substantially wedge-shaped comb having angled top and bottom surfaces can also be provided. The height of the comb and the thickness and structure of the reed plates can also be adjusted to achieve a variety of acoustical objectives. The width of the cells in the comb can also be adjusted to vary cell volume. In addition, substantial axial alignment of the roots of a given pair of reeds can be made to provide different acoustical results for the harmonica. The walls of the cells in the comb can also be tapered to alter acoustical effects. A flexible structural member can also be used in conjunction with the reed plate to enhance harmonica play.

14 Claims, 19 Drawing Sheets

SECT. 9-9

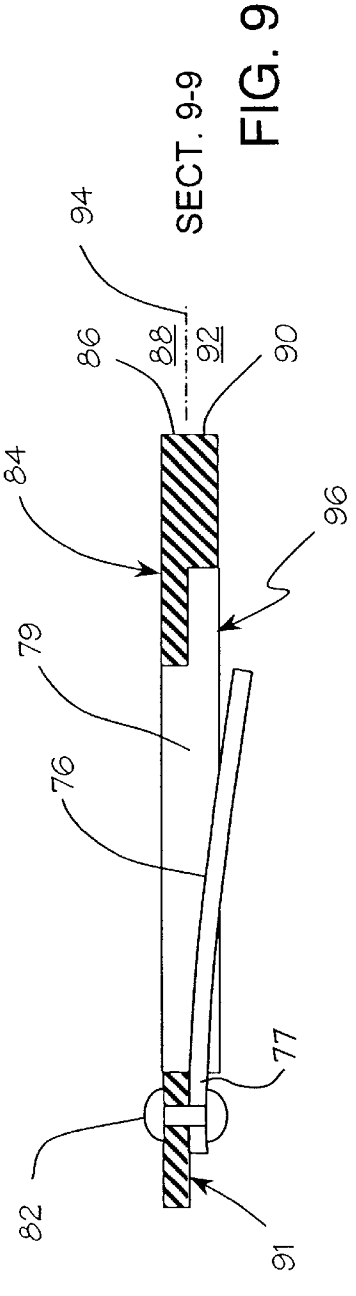
FIG. 9
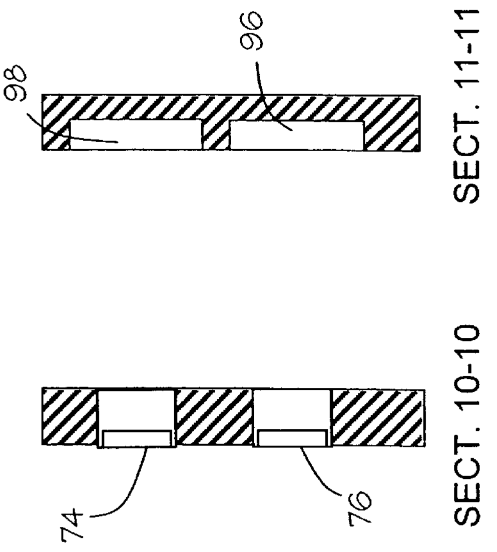
FIG. 10
FIG. 11
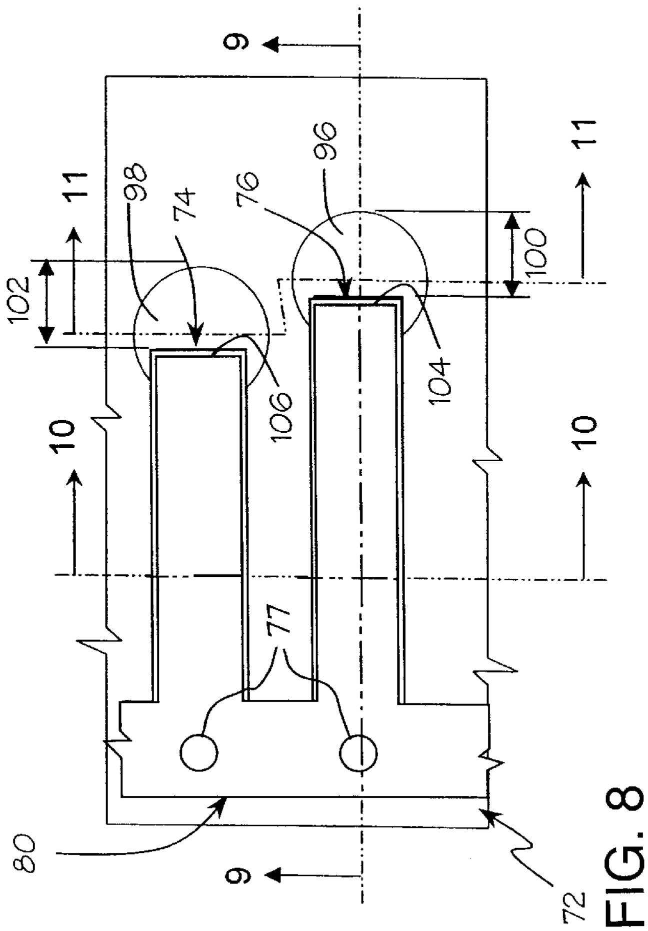
FIG. 8

ENHANCED HARMONICA

CROSS-REFERENCE TO RELATED APPLICATION

This is a continuation of application Ser. No. 09/496,816, filed Feb. 2, 2000 now U.S. Pat. No. 6,359,204.

BACKGROUND OF THE INVENTION

1. Field of the Invention

The present invention generally relates to improvements in the structure and function of a musical instrument. The present invention more particularly relates to improvements in the structure and function of a harmonica.

2. Background Information

Harmonicas are among the world's oldest and most popular musical instruments. Harmonicas produce musical tones by a player blowing or drawing air into the harmonica to vibrate one or more of the reeds of the harmonica. One form of the harmonica is the ten-hole diatonic harmonica. In a diatonic harmonica, twenty reeds produce nineteen natural tones, with one tone being duplicated. The ten-hole diatonic harmonica typically has ten blow reeds, which sound in response to air blown into the harmonica by positive oral pressure; and ten draw reeds, which sound in response to air drawn in through the harmonica by negative oral pressure. The nineteen tones allow the player to play all the diatonic tones of a middle octave and most of the tones of a lower and a higher octave.

A moderately advanced diatonic harmonica player can produce twelve additional tones by a process known as "bending," whereby the player modifies the resonant volume in the vocal passage, principally with the tongue, to "bend" or adjust the tone produced to achieve the desired pitch. A "bend" is therefore a procedure involving the adjustment of the player's embouchure wherein a tone is flatted by causing the normally idle lower-pitched reed of the reed pair in a harmonica to vibrate in its opening mode.

A more advanced player can also produce four additional tones by a technique known as "overblowing," whereby the player more strictly matches the appropriate resonant volume with the tone he or she wishes to produce, typically causing the draw reed of the first, fourth, fifth, and sixth holes to produce tones corresponding to a flatted third of the low octave and a flatted third, fifth, and seventh respectively of the middle octave. Similarly, drawing and a strictly controlled shaping of the resonant passage will produce "overdraw" tones from the blow reeds corresponding to a sharped first, fifth and eighth of the highest octave. On an ordinary diatonic harmonica tuned to the key of C, the overblow tones are Eb-4 of the low octave, Eb-5, F#-5 and Bb-5 of the middle octave, and the overdraw tones are C#-6, G#-6 and C#-7 of the highest octave. Overblow and overdraw tones can be produced from all holes of the diatonic harmonica, but except for those listed, tones can be produced more easily with other techniques. See, e.g., U.S. Pat. No. 5,739,446 to Bahnson.

Therefore, an overblow or overdraw procedure is one in which the tone is sharped by causing the higher pitched reed in a harmonica reed pair to vibrate in its opening mode. Overblow occurs on the first six holes of a standard diatonic harmonica wherein the higher-pitched reed is the draw reed; overdraw occurs on the last four holes of a standard diatonic harmonica wherein the higher-pitched reed is the blow reed.

In all, the most skilled diatonic harmonica player can produce a total of thirty-eight tones from the ten-hole diatonic harmonica, using the normal playing, bending, overblowing, and overdrawing techniques. A problem with any musical instrument, including the diatonic harmonica, is that not all players are highly skilled or even moderately advanced at playing the instrument, and a majority of instrument players are at skill levels far below the advanced level and cannot significantly improve their skills even with much practice.

The technique of "overblowing" is extremely difficult and diatonic harmonica players, even those of great skill, have been known to practice the technique for years before feeling comfortable enough to use the technique in a live performance. The same can be said of the "overdrawing" technique.

Because the seven tones achieved by overblowing or overdrawing are not readily achieved on a ten-hole diatonic harmonica, many less-advanced players resort to a chromatic harmonica, which offers a full chromatic scale of semitones by means of a slide that directs air to reeds pitched a semitone higher than those activated without the slide. However, the chromatic harmonica is not as adaptable as the diatonic harmonica to musical expression such as the type of expression experienced in blues, country, soul, and jazz harmonica music. Although the chromatic scale is easier to play on the chromatic harmonica than on the diatonic, its more limited expression makes it less enjoyable for many, including both listeners and players.

The construction of the diatonic harmonica (See, e.g., FIG. 1) includes a set of ten flexible metallic reeds affixed to a flat reed plate containing rectangular slots through which the reeds vibrate. The typical construction provides an individual reed for each slot. Two such sets of reed plates are typically attached to opposing faces of a comb, thereby creating ten cells, each allowing two notes to be played per cell of the comb: one when blowing and one when drawing.

There are, however, limitations associated with this construction. The usual mechanical connection of reeds on a top surface of the reed plate can create a gap at the reed tip and along the lateral sides or flanks of the reed through which air may leak during play. When the reed vibrates due to a physical influence such as the blowing or drawing action of a musician, these gaps can widen and narrow to permit the reed to vibrate. However, when vibration is initiated, these gaps can also result in one or more unsatisfactory air leaks that can cause the player to blow more forcefully, alter his embouchure, and possibly stop reed vibration from occurring.

This problem is especially acute when attempting to play notes arising from a "bent," "overblown" and/or "overdrawn" procedure. These notes are characterized by an anomalous physical behavior of two given reeds positioned in a cell of the harmonica. As shown in Bahnson et al., "Acoustic and Physical Dynamics of the Diatonic Harmonica," *Journal of the Acoustical Society of America*. Vol. 103(4), pp. 1234–1244, 1998, when one of these maneuvers is performed and achieved, the normally stationary reed can be caused to vibrate while the normally active reed is caused to close. In the case of the overblow procedure, for example, the draw reed operates in an "opening" fashion while the blow reed operates in a "closing" fashion.

As previously discussed, the gap formed between the blow reed and its corresponding slot can create an air leak during this procedure. Consequently, there may be insufficient air pressure to induce vibration in the opening reed. Furthermore, the acoustic impedance of the oral-reed system may be affected so as to prevent vibration, or cause dissonant vibration within the harmonica.

An additional problem associated with conventional harmonica play is the occurrence of aberrant and discordant whistling or squeaking sounds while attempting to play a note. These aberrant sounds can be particularly problematic while attempting an overblow or overdraw procedure. The cause of this phenomenon is the establishment of "edge tones" created by the flow of air through a gap or gaps formed between one or more reeds and the reed plate and subsequent torsional vibration of the reed.

Another problem associated with conventional harmonicas is the difficulty in aligning the reeds within the reed slots of the reed plate during assembly. The clearance between the lateral edges or flanks of the reeds and the corresponding edges of the slot is typically small, in the approximate range of less than 0.002". Because the reed is often affixed to the reed plate with a single rivet or other similar mechanical fastener, it is possible for the reed to rotate about the rivet thereby causing a nonparallel alignment between the rotated reed and the reed plate. Furthermore, irregularities or burrs introduced during fabrication of the reed or reed plate can adversely affect the free vibration of the reed. This is exacerbated when the reed is not properly aligned in its slot within the harmonica.

An additional problem associated with conventional harmonica construction is that roughened surfaces can be present on the edges and other internal surfaces of a reed slot. Because these slots are typically fabricated by the shearing action of a die, their internal surfaces are typically characterized by burrs, grooves and other irregular projections and recesses. These irregularities introduce non-uniformity into the reed slot of the harmonica and can interrupt the smooth flow of air through the reed passage.

A further problem with conventional harmonicas is that the material properties of the reed usually alter during the life cycle of the instrument thereby affecting the pitch and alignment of the reed. If the instrument is played with greater than usual force or air pressure, for example, the pitch of the reed can be altered. To rectify the pitch, the instrument must be disassembled to adjust the reeds. To lower the pitch of the reed, material is removed from the root of the reed, usually by abrasive means, such as sandpaper. To raise the pitch of the reed, material is removed from the reed tip. To readjust the reed position, the reed is manually or mechanically deflected in a exaggerated fashion in the direction opposite of the dislocation, perhaps resulting in a weakening of the attachment of the reed to the reed plate.

A still further problem associated with conventional harmonica play is that the player must modify his or her oral cavity to achieve certain bends, overblows, or overdraws. Low draw bends typically require excessively large embouchure, necessitating that the jaw be lowered, and the tongue positioned low in the oral cavity. Conversely, overblows, blow bends, and overdraws require relatively small oral volume and that the tongue of the musician to be positioned against the palate with the tip forward against the upper teeth. The volume provided within the comb of the harmonica supplements the volume required within the oral cavity of the musician. Therefore, enlarging the cavity would facilitate draw bends, while reducing the volume of the cavity would facilitate overblows, overdraws and blow bends.

A number of devices have been used to improve the playing of harmonicas. Paris, U.S. Pat. No. 574,625, discloses a siding mouthpiece for transferring a blast of air from one cell chamber to another without moving the lips. Newman, U.S. Pat. No. 1,671,309, discloses a chromatic harmonica having a frontal slide which occludes certain blow holes in the harmonica to allow the player to achieve a chromatic scale, as opposed to a diatonic scale. Other chromatic harmonicas having blow hole-occluding devices include U.S. Pat. Nos. 1,752,988; 2,005,443; 2,339,790; and 2,675,727.

Bahnson, U.S. Pat. No. 5,739,446, discloses a harmonica and method of playing which involves the use of a valve mechanism. A sliding set of louvers is added to one side of each reed plate, which apparently, when activated, block the air leakage from the inactive reed. This mechanism appears to be relatively complicated and expensive to implement. The Bahnson harmonica also appears to require the player to activate the valve at the exact instant that the overblow note is to be played, thus requiring additional motions and interaction with the harmonica by the player, and preventing modulation of frequency as required for certain tremelo effects.

Accordingly, an advance in the art could be realized if a harmonica could be constructed which readily permits the production of bent, overblown, and overdrawn tones, enabling even the player having limited skills to achieve the characteristic expression of the diatonic harmonica and yet realize the full half tone scale capability of the chromatic harmonica. It would also be beneficial to provide a harmonica that permits the overdrawing and overblowing techniques of the invention to be practiced without otherwise requiring any significant changes in playing techniques. Another significant benefit could be realized from a harmonica that is more susceptible to the techniques of bending, overblowing and/or overdrawing.

A harmonica with reeds and associated reed plates that reduce the excessive leakage of airflow from the cells of the harmonica is also needed. What is also needed is a simple construction for use in fabricating and assembling reed plates that also improves harmonica performance and reduces lifetime maintenance and tuning. Another advantage could be realized by providing a harmonica having reed slots with generally uniform and relatively smooth surfaces that improve interaction between reeds and reed slots. What are also needed are improvements in the structure of the comb body, the reed plates and the position of reeds within a conventional harmonica. A harmonica is needed that can achieve draw and blow bends by improving interaction between a reed pair in a cell.

Still another problem that needs to be addressed is that of achieving sufficient loudness from the harmonica. An improvement is needed that can increase the amount of time the reed spends in the slot, thereby increasing the time that the reed receives aerodynamic impetus for vibration. Under circumstances of high-pressure airflow in the harmonica, such as when the player exerts sufficient pressure to cause the tip of reed to vibrate entirely through its respective slot, then a new leakage path is created. A means of reducing the leakage caused by this new path would be advantageous in an improved harmonica.

SUMMARY OF THE INVENTION

The improved harmonica structures of the present invention have met and/or exceeded the above-described needs.

The harmonica structures of the present invention include, in one embodiment, a reed comb having a common bridge with reeds formed integrally with the common bridge. The reed plate has a plurality of reed slots formed therein and is adapted to receive the reeds of the reed comb into corresponding slots formed in the reed plate. The reed plate has a first portion positioned within a first plane and a second portion positioned in a second plane. The second portion of the reed plate has a stepped portion formed therein adapted to receive a reed of the reed comb therein to permit substantial encasement of the reed within the reed slot.

In the harmonica of the present invention, one or more counterbores can be formed in the reed plate adjacent to the tips of the reeds. The counterbore can extend a distance beyond or behind the reed tip and can be provided in a variety of configurations, such as a rectangular shape. In addition, material can be applied to a surface of the reed plate at a location adjacent to the flanks of the reeds to resist leakage of air between the reed plate and the flanks of the reed during harmonica play. The reed plate can include a first stepped portion upon which the roots of the reeds are positioned and a second stepped portion positioned adjacent to the tips of the reeds.

In another aspect of the present invention, the reeds can be formed by direct cutting or forming of the reeds in the reed plate. A reed is formed by cutting along three sides of its perimeter and leaving the fourth or "short" side uncut. This provides a substantially integrally formed reed plate.

In still other aspects of the present invention, a radiused surface can be formed on a portion of the reed or on the surface of the reed slot in which the reed is positioned. A substantially wedge-shaped comb having angled top and bottom surfaces can also be provided. In another aspect of the present invention the height of the comb and the thickness and structure of the reed plates can be adjusted to achieve a variety of acoustical objectives. The width of the cells in the comb can also be adjusted to vary the volume of individual cells. In addition, substantial axial alignment of the roots of a given pair of reeds can be made to provide different acoustical results for the harmonica. The walls of the cells in the comb can also be tapered to alter acoustical effects. A flexible structural member can be used in conjunction with the inside surface of the cells of the comb to close a slot in the reed plate during harmonica play.

The present invention will be more fully understood from the following description of the invention and by reference to the figures and claims appended hereto.

BRIEF DESCRIPTION OF THE DRAWINGS

A full understanding of the invention can be gained from the following detailed description of the invention when read in conjunction with the accompanying drawings in which:

FIG. 8 is a top plan view of a reed plate of an embodiment of the present invention;

FIG. 9 is a sectional view taken along 9—9 of FIG. 8;

FIG. 10 is a sectional view taken along 10—10 of FIG. 8;

FIG. 11 is a sectional view taken along 11—11 of FIG. 8;

DETAILED DESCRIPTION OF THE EMBODIMENTS

Figure 1:
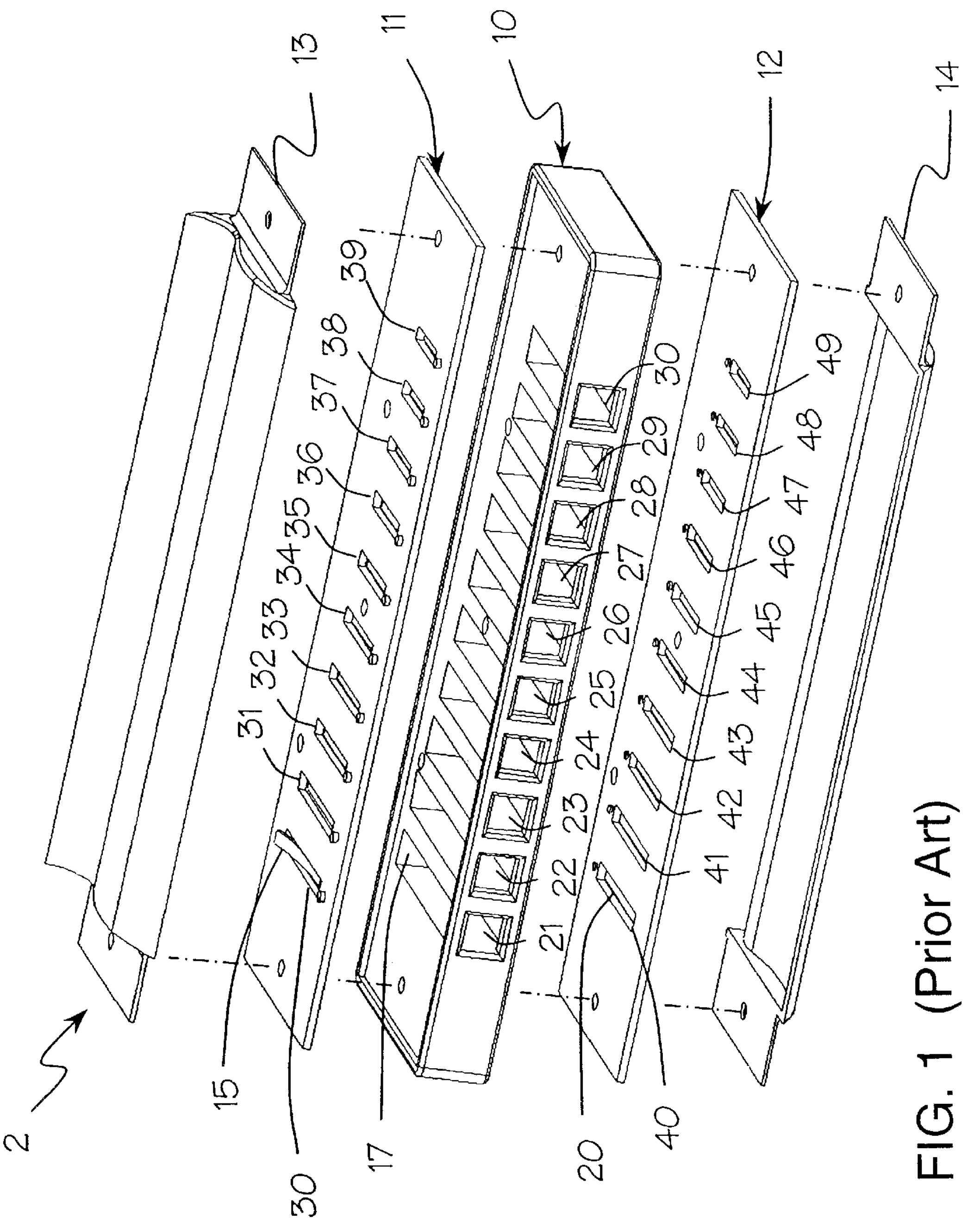
FIG. 1 (Prior Art)
FIG. 1 is an exploded, isometric view of a conventional diatonic harmonica.
Figure 2:
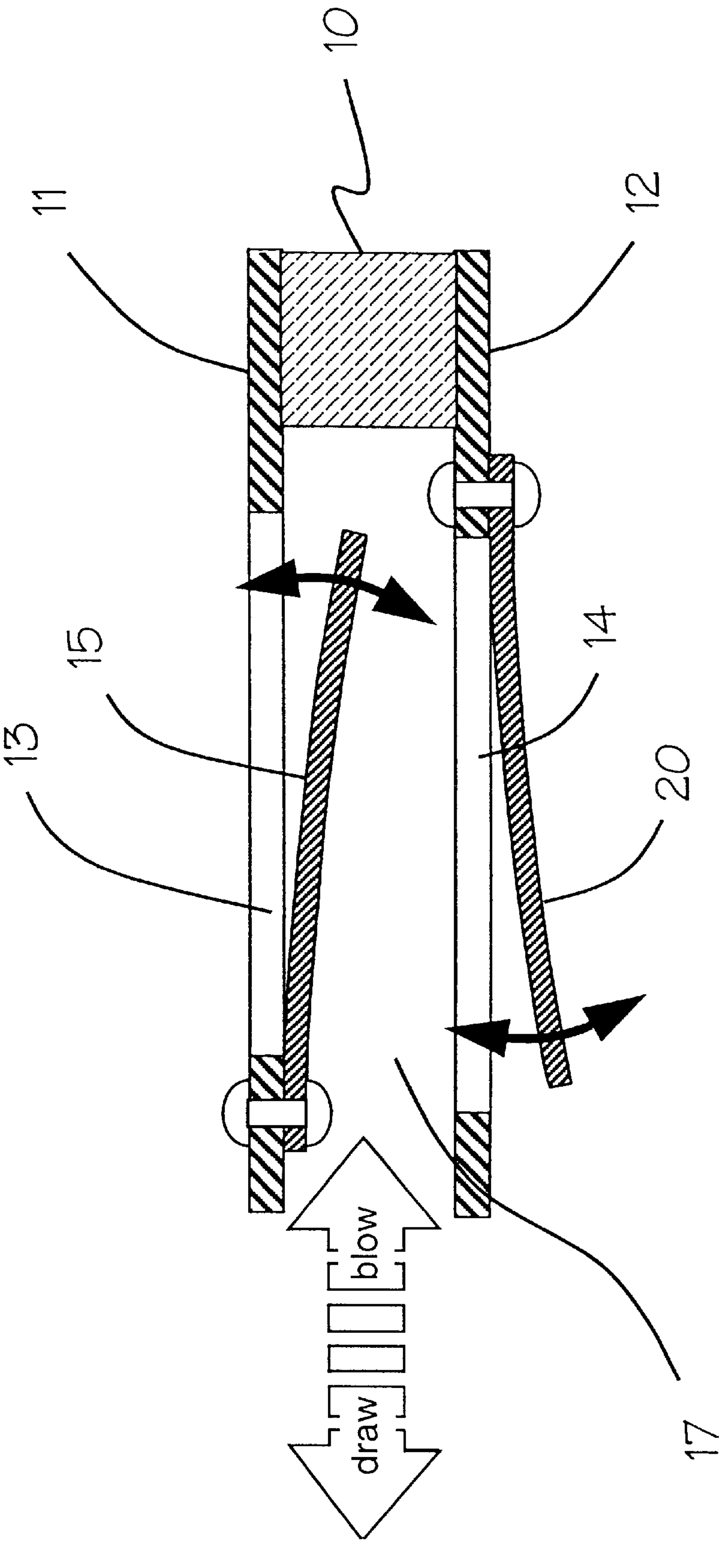
FIG. 2 (Prior Art)
FIG. 2 is a sectional view of a set of reeds in a conventional diatonic harmonica.

Referring now to FIGS. 1 and 2, a diatonic harmonica 2 is shown including a body or "comb" depicted generally at 10. The comb 10 is preferably fabricated of a wood, resinous plastic or metal material. The comb 10 is sandwiched between two reed plates 11, 12 which include a blow reed plate shown generally at 11 and a draw reed plate shown generally at 12. The plates 11, 12 are further sandwiched within a housing comprising an upper cover 13 and a mating cover 14. The plates 11, 12 are preferably composed of brass or another similar material suitable for use in a harmonica. It can be appreciated that the harmonica 2 can be assembled by use of conventional mechanical fasteners such as screws, bolts and the like.

As shown in FIGS. 1 and 2, the blow reed plate 11 contains a plurality of blow reed slots 30–39, that each accommodate a blow reed such as reed 15 (shown slightly flexed) in each blow reed slot, such as slot 30. The blow reeds 15 are mounted on the blow reed plate 11 such that when the blow reed plate 11 is positioned next to the comb 10 during assembly, the blow reeds 15 seat inside the cells such as cell 17 formed within the comb 10. These cells 17 allow air passage into and out of the harmonica 2 by the actions of blowing and drawing, respectively.

Referring again to FIGS. 1 and 2, the draw reed plate 12 has within it a series of draw reed slots, 40–49, each including a draw reed such as draw reed 20 therein. The draw reeds 20 are mounted on the outside of the draw reed plate 12 relative to the comb 10. The draw reeds 20 naturally vibrate when the harmonica player draws air out of the harmonica. Each blow reed 15, such as the blow reed 15 in position 30, has a corresponding draw reed 20, such as the draw reed 20 in position 40, positioned substantially opposite the blow reed 15, such that the matched pair of reeds 15, 20 share a common cell 17. During harmonica play, each cell 17 communicates with a blow reed 15 and a draw reed 20 as a matched pair of reeds 15, 20.

Referring again to FIGS. 1 and 2, the draw reeds 20 in positions 40–49 normally sound only when air is drawn out of the harmonica 2. This is how the diatonic harmonica 2 is designed to operate during normal play. However, it has been established that during certain procedures, known as "bends," "overblows," and "overdraws," wherein the resonance of the vocal tract is critically altered, both the draw reeds 20 and the blow reeds 15 can be caused to vibrate sympathetically.

Referring again to FIGS. 1 and 2, reeds 15 and 20 are normally attached by a rivet or another suitable mechanical fastener to the reed plates 11, 12 so that each reed, in its detent or resting position, is in a substantially parallel position with respect to the reed plate but is also substantially outside respective reed slots, 30 and 40. In normal functioning of the harmonica 2, the reeds are caused to vibrate by positive or negative air pressure applied to the cells 17 by the player. During a blowing action, the blow reed 15 is caused to close while draw reed 20 is caused to open. The closing action of the blow reed 15 normally results in a sustained oscillation due to the inverse relationship between the air pressure and the aerodynamic resistance across the reed slot 30. That is, additional instantaneous air pressure causes the reed 15 to close further, thereby decreasing the clearance between the reed 15 and the blow reed plate 11, and thereby increasing the aerodynamic drag. This, in turn, causes a reduction of airflow that inevitably allows the normal elasticity of the reed 15 to reopen the slot 30. By contrast, the draw reed 20 is moved to an open position during a blowing operation, thereby decreasing its aerodynamic resistance. As such, the draw reed 20 does not support oscillation, but instead accounts for unwanted loss of air pressure. Likewise, when the player draws through passage 17, the roles of the reeds are reversed.

Under certain situations, both reeds can be caused to oscillate. This generally occurs when the player is drawing through the first six cells 21–26 of the harmonica 2 or blowing through the last four cells 27–30 of the harmonica. In each of these situations, the opening reed is tuned to a frequency lower than the closing reed in the shared, corresponding cell, such as cell 17 for the reeds 15, 20. Likewise, during a draw bend or blow bend procedure, the vibration of the lower-pitched opening reed increases while the vibration of the closing reed decreases.

Figure 5:
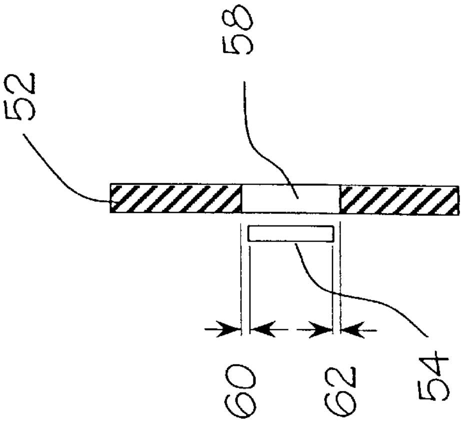
FIG. 5 (Prior Art)
FIG. 5 is a sectional view taken along 5—5 of FIG. 3.
Figure 4:
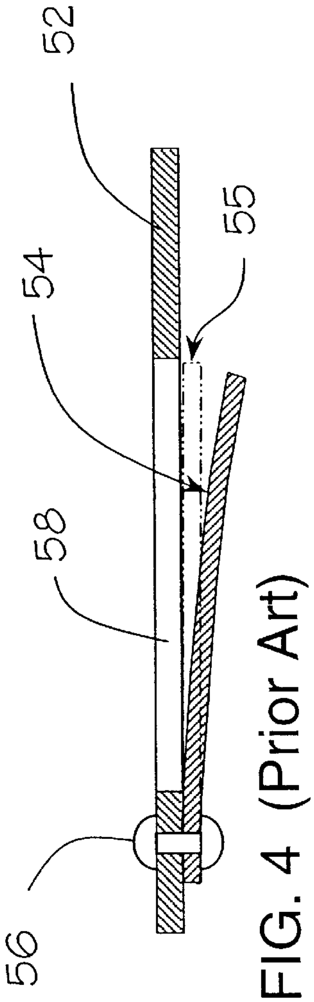
FIG. 4 (Prior Art)
FIG. 4 is a sectional view of a single reed attached to a reed plate in a conventional harmonica.
Figure 3:
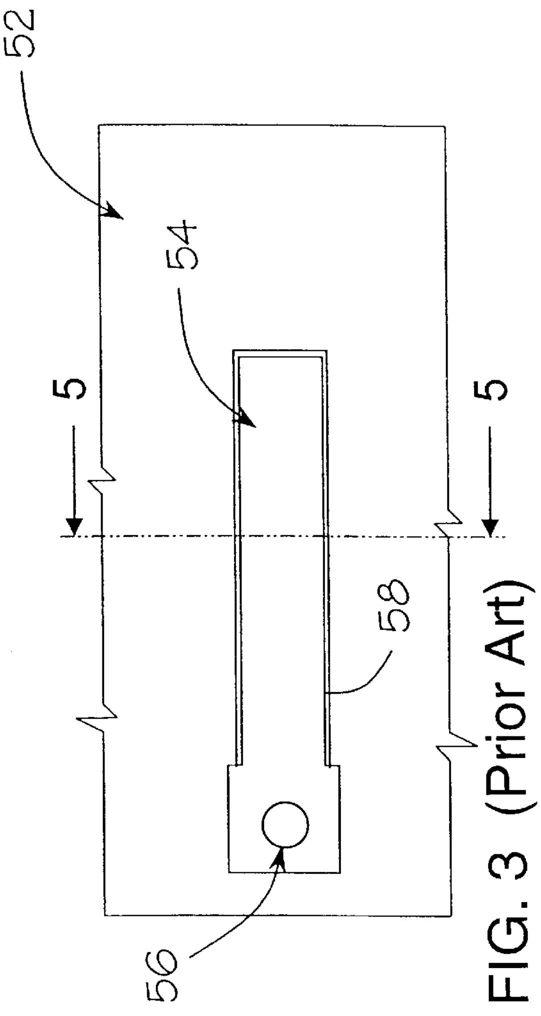
FIG. 3 (Prior Art)
FIG. 3 is a plan view of a reed attached to a reed plate in a conventional harmonica.

Referring now to FIGS. 3 through 5, a reed plate 52 is shown having a reed 54 attached thereto such as by a mechanical fastener or rivet 56. In a closed position 55 of the reed 54 as it vibrates in position over the slot 58 formed in the reed plate 52, lateral gaps 60, 62 are formed between the reed 54 and the reed plate 52. During harmonica play, these gaps 60, 62 disadvantageously permit air to escape or enter the slot 58 between the reed 54 and the reed plate 52.

Figure 7:
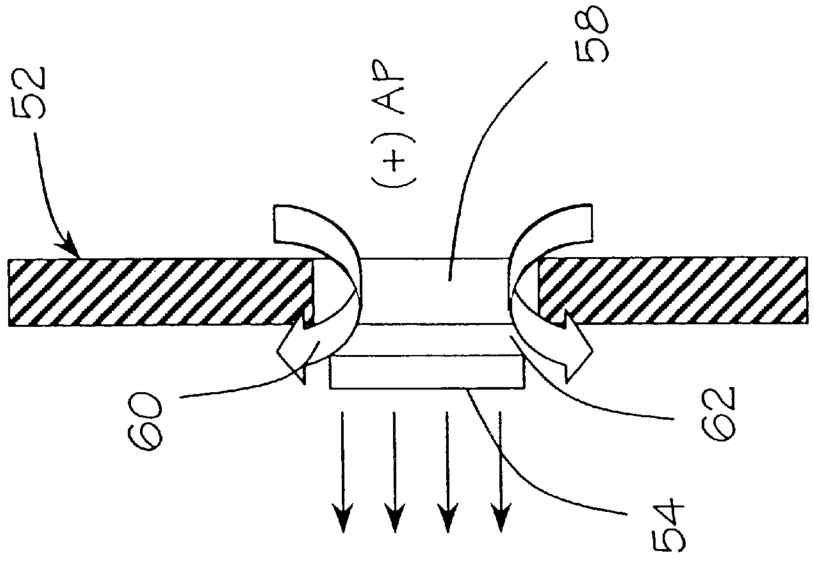
FIG. 7 (Prior Art)
FIG. 7 is a partially schematic sectional view of a reed and reed plate exhibiting air leakage during an opening action of the reed.
Figure 6:
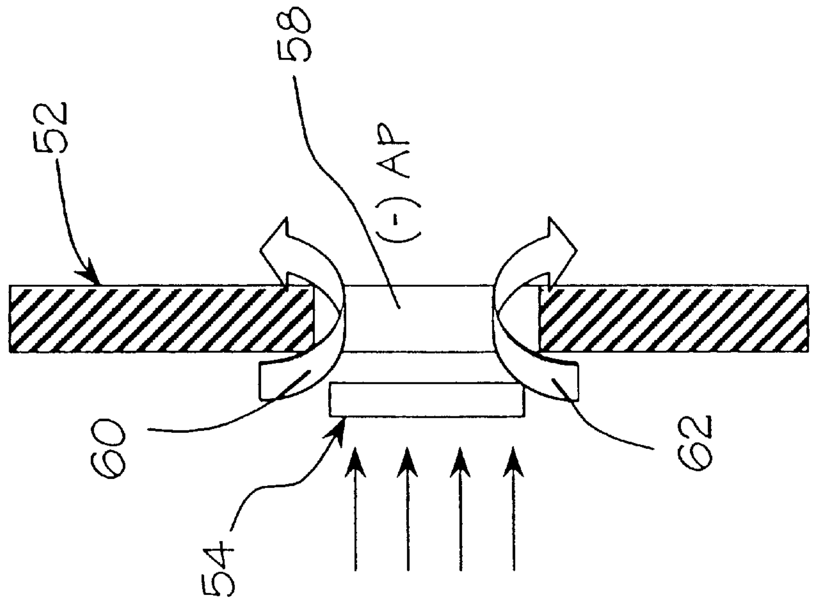
FIG. 6 (Prior Art)
FIG. 6 is a partially schematic sectional view of a reed and reed plate exhibiting air leakage during a closing action of the reed.
Figure 12:
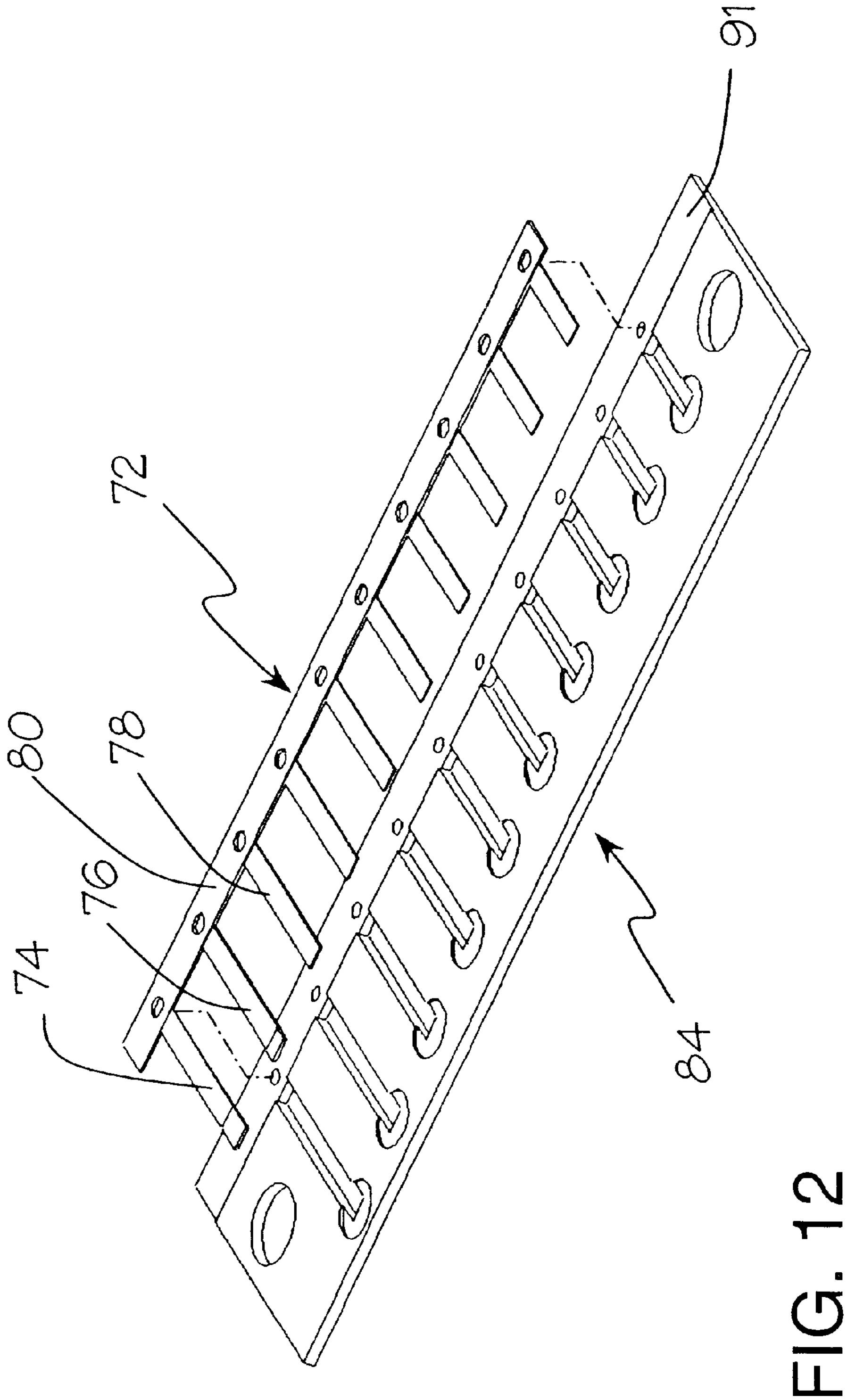
FIG. 12 is an exploded isometric view of a reed comb and reed plate of an embodiment of the present invention.

As shown more particularly in FIGS. 6 and 7, during harmonica play air flow can pass through lateral gaps 60, 62 during a closing action or by relative motion of the reed 54 in the direction of the slot 58 of the reed plate 52 (as shown in FIG. 6). The closing action of the reed 54 is caused by the negative air pressure −AP. In addition, the air flow can pass through lateral gaps 60, 62 during an opening action or by relative movement of the reed 54 away from the reed plate 52 and the slot 58 (as shown in FIG. 7). The opening action of the reed 54 is caused by the positive air pressure +AP.

Referring now to FIGS. 8 through 12, the harmonica of the present invention includes a reed comb 72 having a plurality of integrally formed reeds such as reeds 74,76,78 extending from a common bridge 80. The reed comb 72 is adapted to be received and connected by mechanical attachment such as by rivet 82 onto a reed plate 84 having a plurality of reed slots such as reed slot 79 formed therein. The reed plate 84 has a first portion 86 positioned within a first plane 88 and a second portion 90 extending through a second plane 92. The first plane 88 is substantially parallel to the second plane 92 as shown. The second portion 90 of the reed plate 84 also has a stepped portion 91 on a surface of the first portion 86 of the reed plate 84. The root 77 of the reed 76 rests on this stepped portion 91 and is mechanically connected as previously discussed to the reed plate 84 by the rivet 82. A counterbore 96 is formed within the second portion 90 of the reed plate 84. It is therefore the function of the stepped portion 91 to permit substantial encasement of the reed 76 within the reed slot 79. The counterbores 96, 98 can extend distances 100, 102, respectively beyond the tips 104, 106 of the reeds 76, 74.

It can be appreciated that the reed plates and reed combs can be fabricated in any of several ways including conventional milling, die stamping, electron discharge machining, laser cutting, electroforming or photo-etching to promote reed dimensions and alignment relative to the common bridge. Furthermore, an integrally formed and single-piece reed comb is relatively easier to assemble to the reed plate than a conventional harmonica design typically wherein ten individual reeds are assembled to a reed plate. In addition, in the harmonica of the present invention, the rotational alignment of the reed with respect to the reed comb is assured by the integral association of the reeds with the common bridge of the reed comb.

This invention therefore features a novel configuration of reeds within the reed slots of a given reed plate. Unlike the stacked arrangement of reeds on top of a conventional reed plate slot, the reeds of this invention are situated partially or substantially within a counterbore. The counterbore proves a small clearance at the tip of the reed near the second portion of the reed plate. However the flanks of the reed are positioned substantially within the slot of the reed plate when the reed moves toward the reed plate slot during play. This structure thereby substantially interrupts the leakage of air characterized by conventional harmonica play. This interruption of airflow also reduces the edge tones responsible for undesirable whistling and squealing while playing a harmonica.

The reeds of the present invention are composed of a material selected from the group of elastic metals including phosphor bronze, beryllium copper, brass, and nickel-titanium alloy. Nickel-titanium alloy is characterized by relatively high elasticity and durability, and is therefore a preferred material for the reeds of the present invention. This alloy also addresses the problems associated with relatively softer materials, namely the problem of detuning of the harmonica due to strain hardening and fatigue.

In addition, a material that is too yielding can result in dislocation of harmonica components such as the reeds.

Figure 13A:
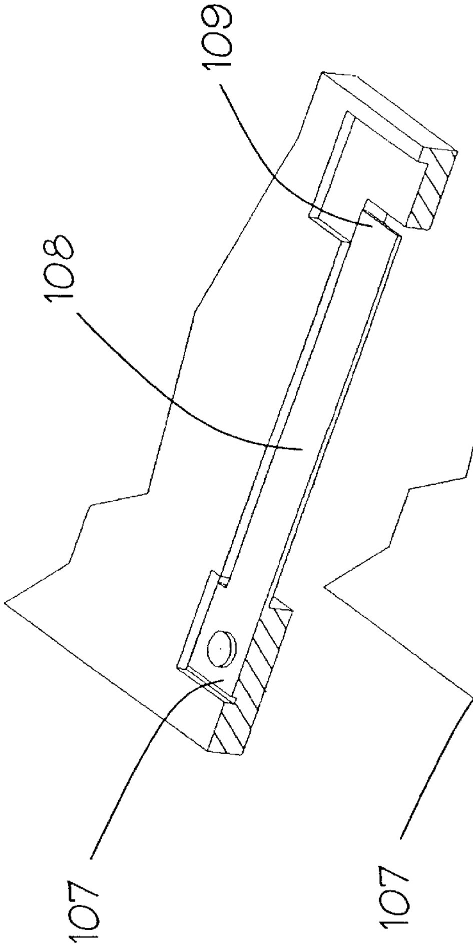
FIG. 13A is a fragmentary, isometric view of an embodiment of the present invention.
Figure 13B:
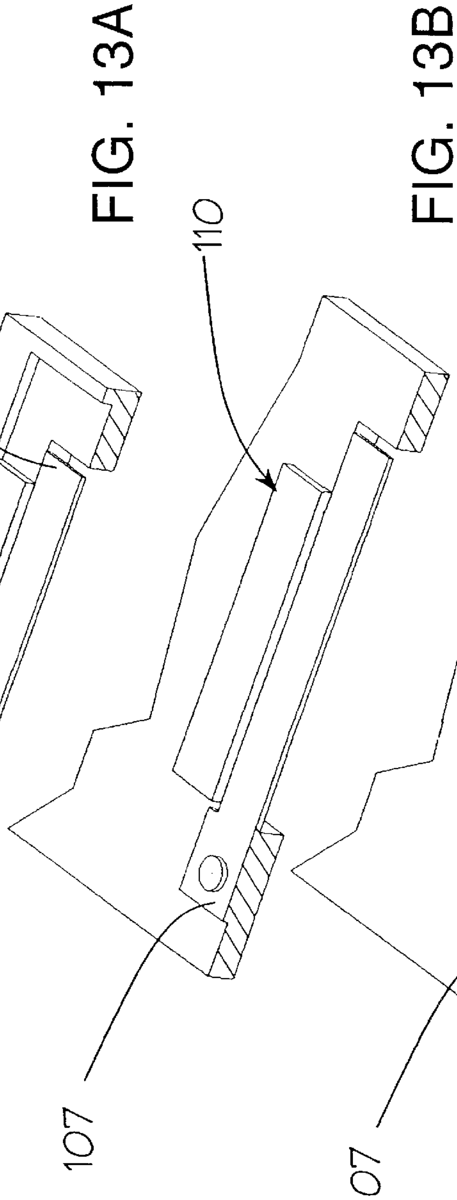
FIG. 13B is a fragmentary, isometric view of an embodiment of the present invention.
Figure 13C:
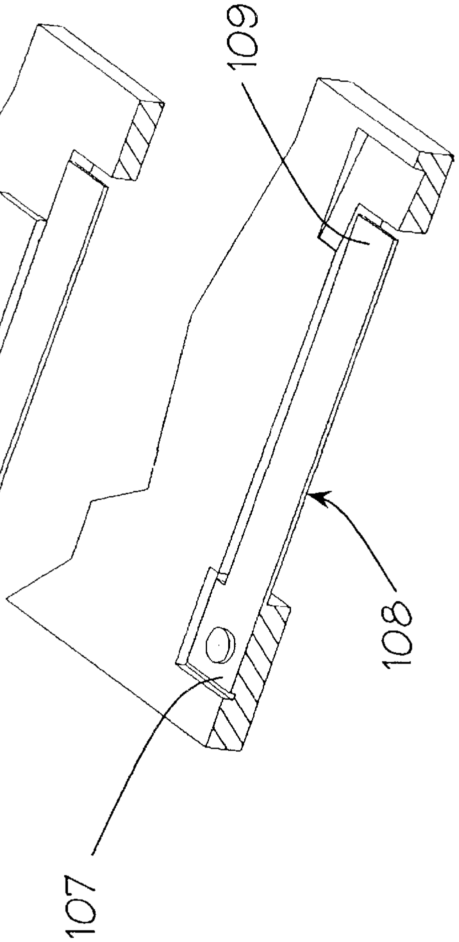
FIG. 13C is a fragmentary, isometric view of an embodiment of the present invention.

It should be appreciated that although the embodiment of the present invention depicted in FIGS. 8 through 12 shows a reed plate having material removed near the tip and near the base of the reed, substantially similar properties can be achieved if material is added along the flanks of the reeds. Referring now to FIGS. 13A, 13B and 13C, it is shown that material can be removed from the area adjacent to the root 107 of the reed 108. Material can also be removed from the reed plate in the vicinity of the tip 109 of the reed 108. As shown in FIG. 13B, material 110 can be positioned adjacent to the reed 108 to resist leakage of air between the reed plate and the flanks of the reed 108 during harmonica play. Material removed from the vicinity of the tip 109 of the reed 108 can form a substantially ramped surface, as shown in FIG. 13C.

Figure 14:
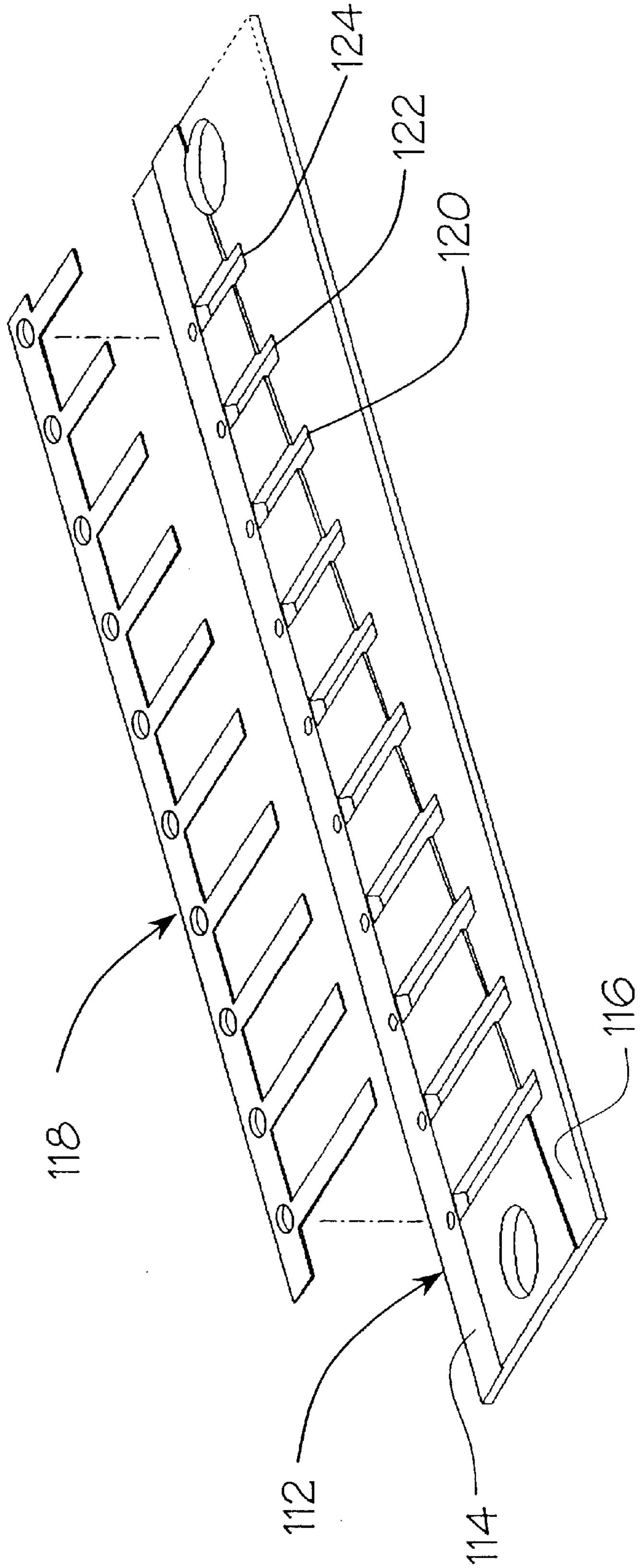
FIG. 14 is an exploded isometric view of a reed comb and reed plate of an embodiment of the present invention.

Referring now to FIG. 14, the reed plate 112 of the present invention can include two stepped portions 114, 116 in conjunction with assembly of a reed comb 118 with the reed plate 112. The stepped portion 116 extends along substantially the entire length of the reed plate 112. In the form of the invention shown, a plurality of recesses such as recesses 120, 122, 124 are also formed in the reed plate 112.

Figure 15:
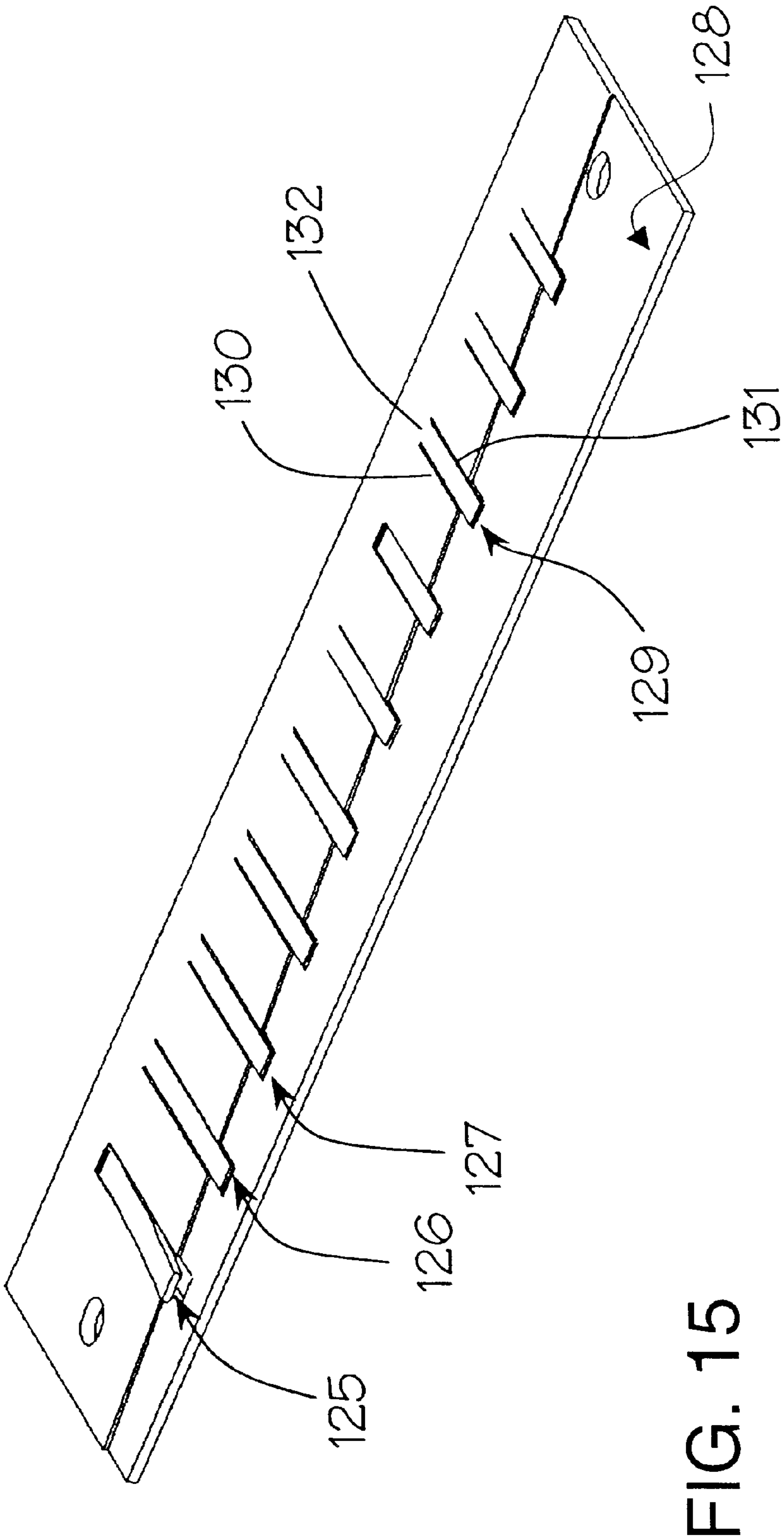
FIG. 15 is an isometric view of an integrated reed-bridge reed plate of the present invention.
Figure 16:
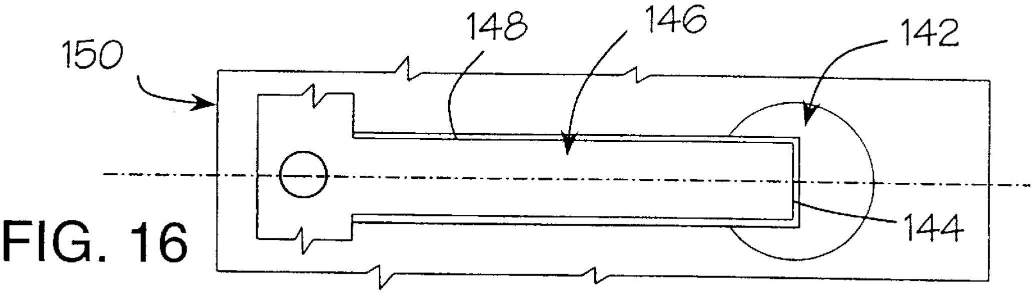
FIGS. 16–19 are top plan views of reed plate embodiments of the present invention.

Referring now to FIG. 15, in another embodiment of the present invention, the reeds 125, 126, 127 are formed integrally with the reed plate 128 of the harmonica by cutting along three sides 129, 130, 131 of the perimeter of each reed. This permits each reed to cantilever from the fourth, uncut side 132 of each reed when the reed vibrates during harmonica play.

Figure 17:
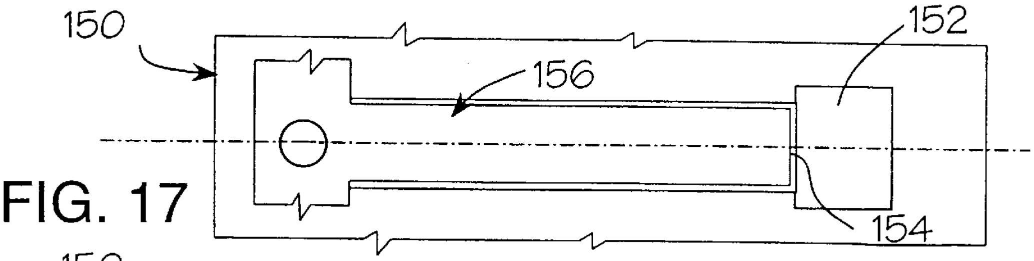
Figure 18:
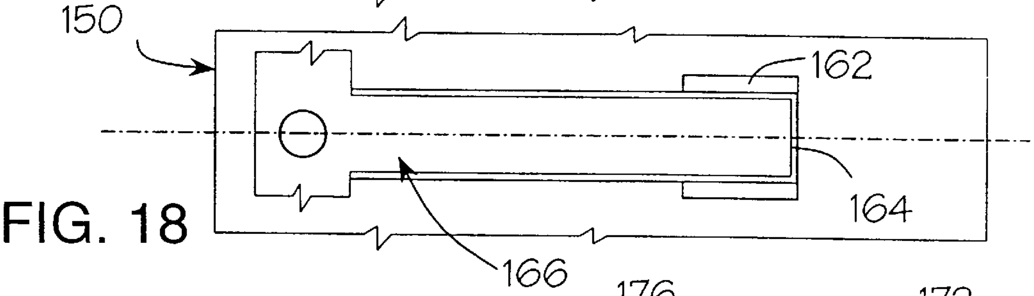
Figure 19:
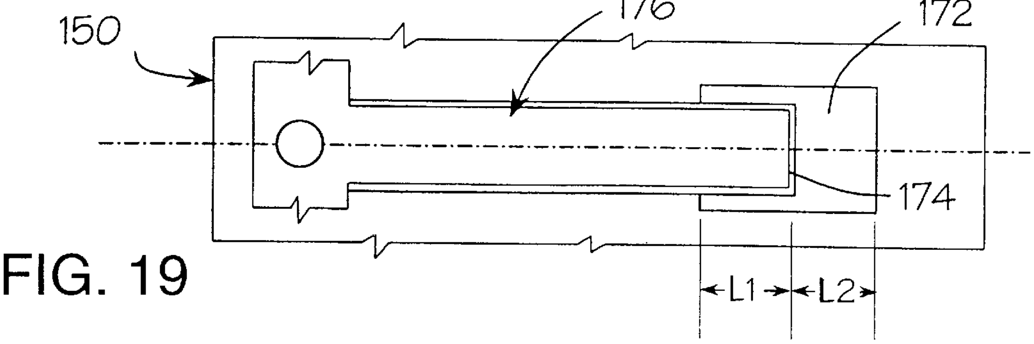

Referring now to FIGS. 16 through 19, FIG. 16 shows an aspect of the present invention wherein the recess 142 at the tip 144 of the reed 146 positioned in the slot 148 of the reed plate 150 is a substantially circular counterbore. FIG. 17 shows an aspect wherein the recess 152 at the tip 154 of the reed 156 is a rectangular counterbore located primarily forward of the tip 154 of the reed 156 on the reed plate 150. FIG. 18 shows an aspect wherein the recess 162 at the tip 164 of the reed 166 is a rectangular counterbore located primarily behind the tip 164 of the reed 166 on the reed plate 150. FIG. 19 shows an aspect wherein the recess 172 at the tip 174 of the reed 176 is a rectangular counterbore located both in front of the tip 174 of the reed 176 a distance $L_1$ and behind the tip 174 of the reed 176 a distance $L_2$.

Figure 20:
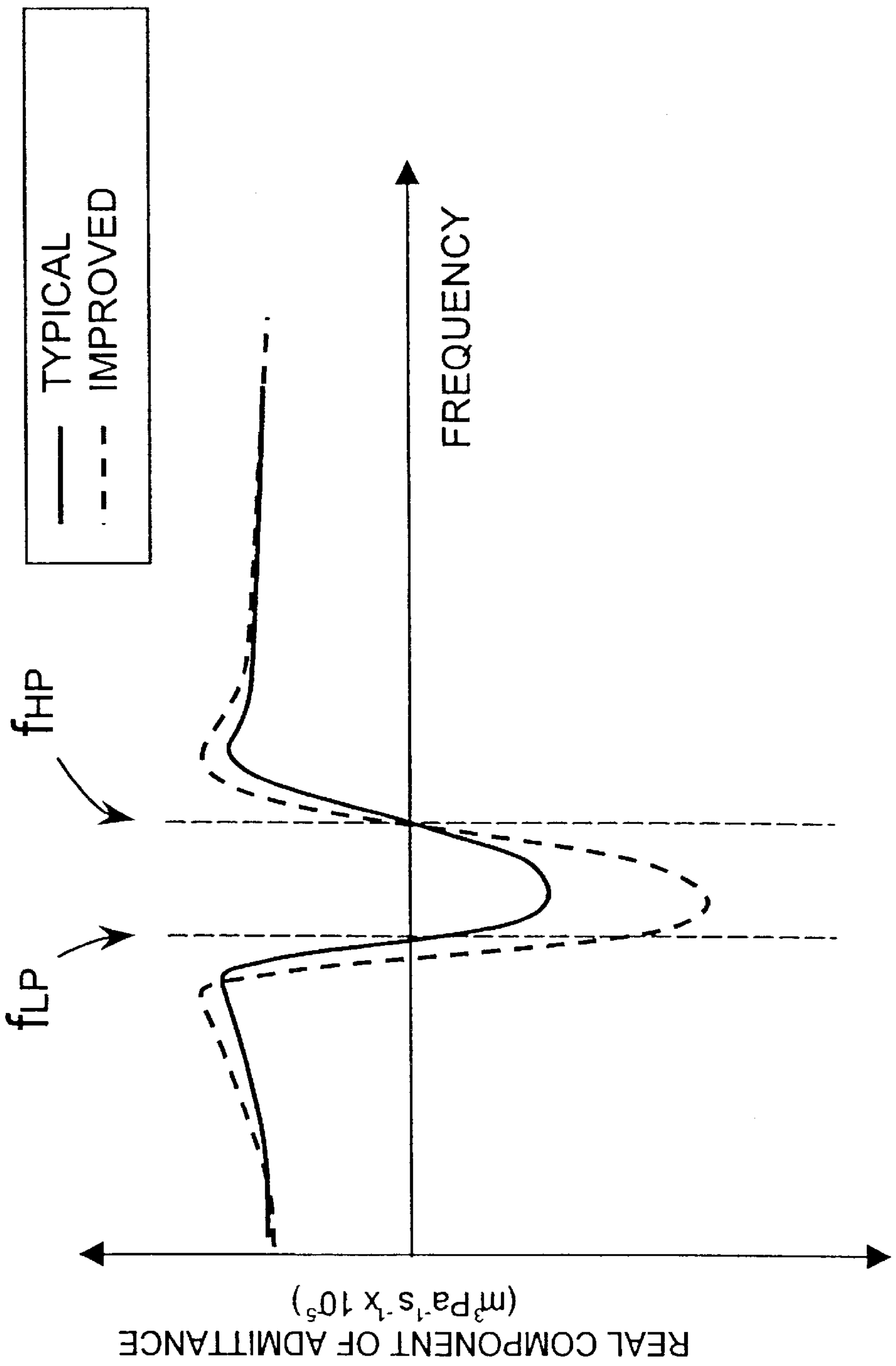
FIGS. 20 and 21 are plots of the real component of acoustical admittance versus frequency during harmonica play.
Figure 21:
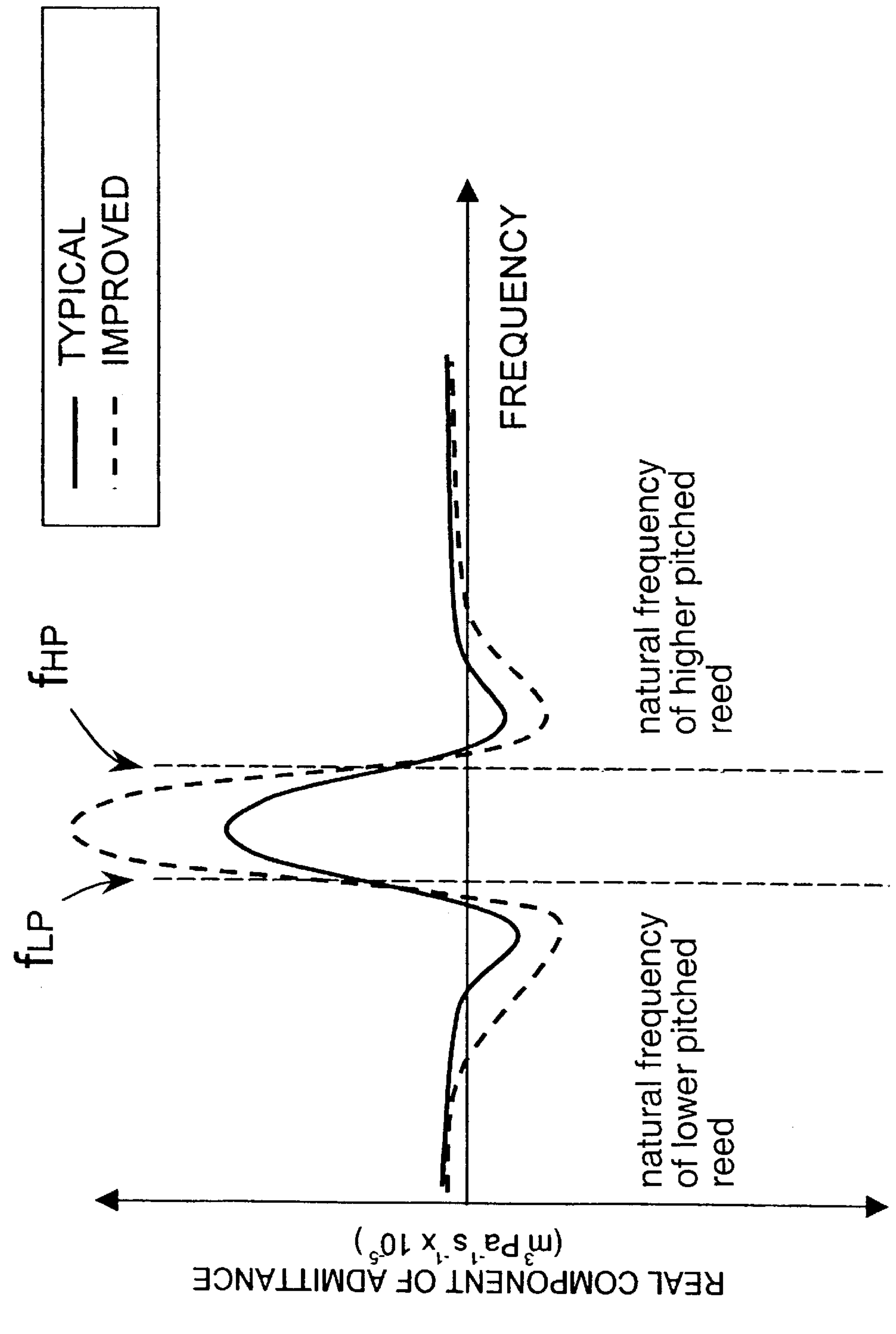

Referring now to FIGS. 20 and 21, the acoustic performance of reeds in a harmonica can be characterized by their acoustic admittance, defined as the first derivative of acoustic flow with respect to pressure. This is typically a complex quantity, containing a real part and an imaginary part. Vibration theory prescribes that when the real part of the complex admittance is negative, the reed exhibits sustained vibration. When plotted as a function of frequency and pressure, the typical response of a pair of reeds such as those found in a harmonica is shown as a solid-line plotted in FIGS. 20 and 21.

FIG. 20 depicts the admittance of a reed pair wherein the higher-pitched reed is operating as a closing reed and the lower-pitched reed is operating in its opening mode. For example, this admittance is provided when a harmonica player is drawing holes 1 to 6 or blowing holes 7 to 10 of a standard 10-hole diatonic harmonica. The fundamental frequencies of the lower-pitched reed and the higher-pitched reed are shown as $f_{LP}$ and $f_{HP}$, respectively.

FIG. 21 depicts the admittance of a reed pair wherein the lower-pitched reed is operating as a closing reed and the higher-pitched reed is operating in its opening mode. This admittance characteristic is provided when the player is blowing through holes 1 to 6 or drawing through holes 7 to 10 of the 10-hole diatonic harmonica. The second "dip" seen in FIG. 20 corresponds to the overblow or overdraw note which is distinct from the respective blow and draw notes.

In the context of FIGS. 20 and 21, an object of the present invention is to increase the range (bandwidth) of the unstable frequencies and to increase the range of acoustic admittance for which the reed is unstable. This, in turn, enlarges the range of oral geometries that a player may achieve a desired tone. It can also have the effect of lowering the pressure at which instability occurs. This is shown more particularly by the dashed curves in FIGS. 20 and 21. These acoustic admittance curves of reed pairs are adapted and shown herein for illustrative purposes from Johnston, R. B., "Pitch Control in Harmonica Playing," *Acoust. Aust.* 15(3), 69–75 (1987).

Figure 22:
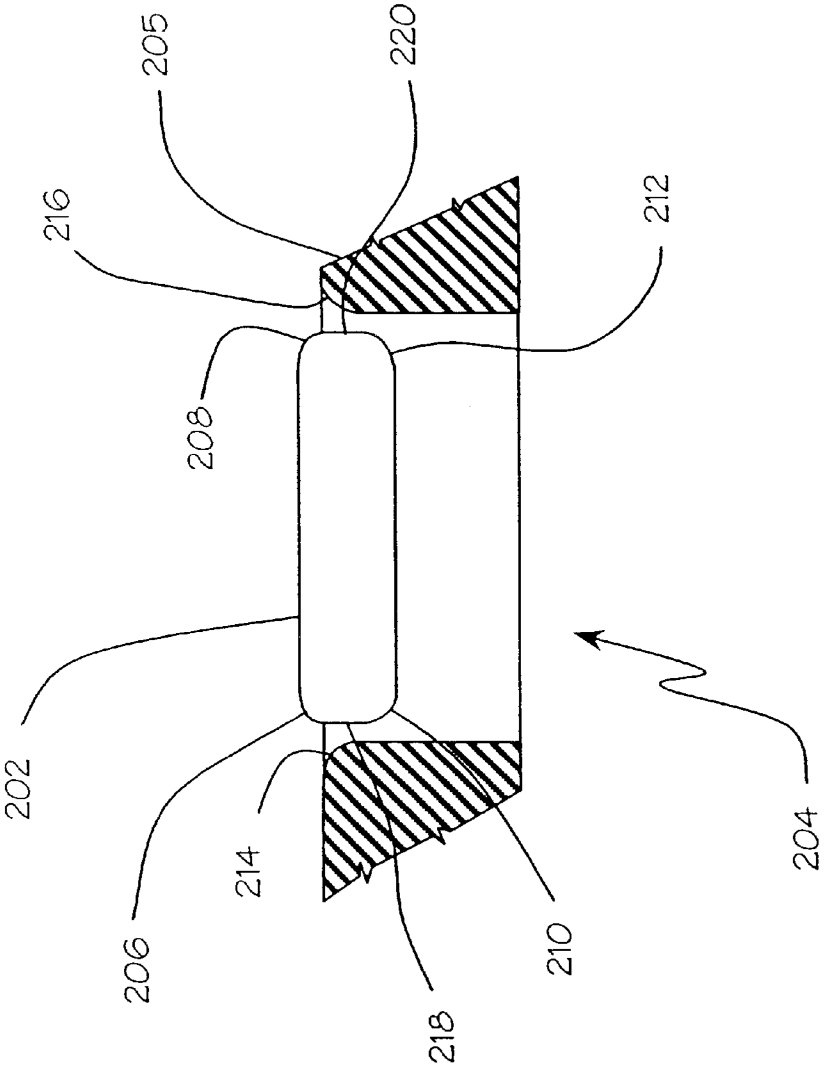
FIG. 22 is a sectional view of a portion of a reed plate and reed embodiment of the present invention.

Referring now to FIG. 22, in another embodiment of the present invention, a cross-section of a reed 202 of the present invention is shown partially positioned within its respective reed slot 204 in a reed plate 205. The radii 206,208,210,212,214,216 are provided along the reed 202 and the upper and lower portions of the flanks 218, 220 of the reed 202 to improve the aerodynamics of the airflow traveling between the reed 202 and the reed plate 205 during harmonica play. These radii are preferably in the range of about 0.001 to 0.0025 inches. An advantage of these radii is reducing undesirable edge tones usually causing discordant "whistle" sounds emanating from the closing action of the reed 202.

Figure 23:
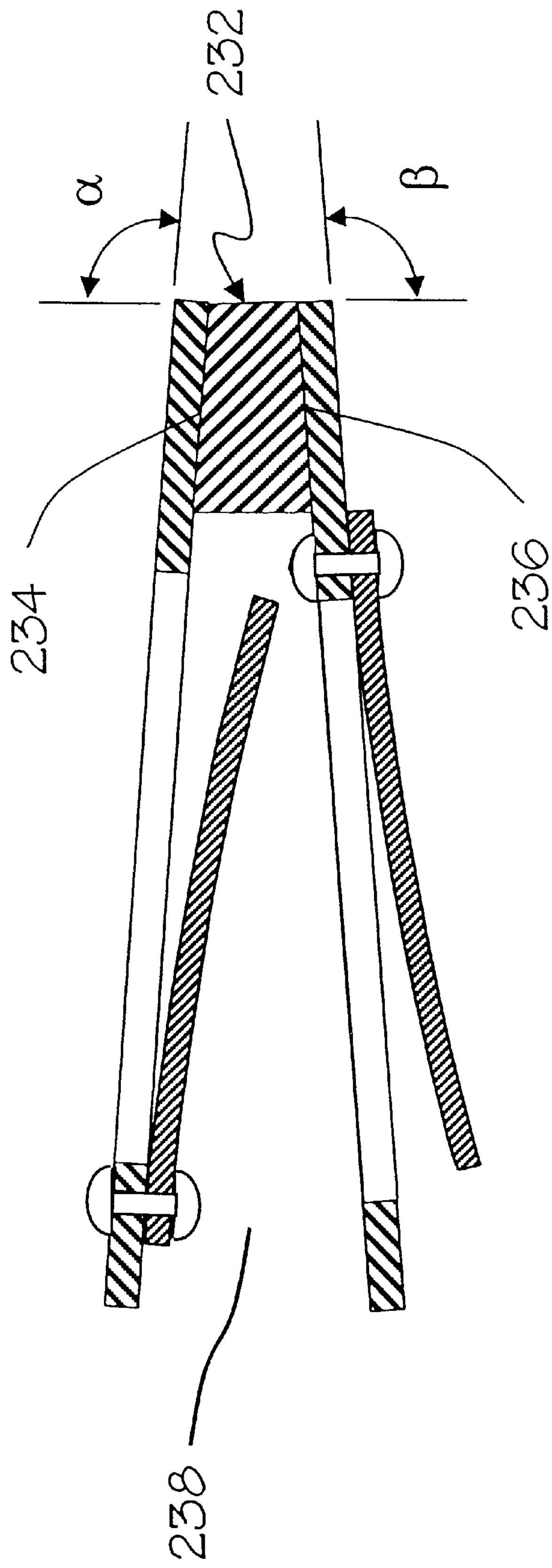
FIG. 23 is a sectional view of a comb embodiment of the present invention.

Referring now to FIG. 23, in another aspect of the present invention, the comb 232 of the harmonica is principally a wedge-shaped structure having a top surface 234 sloped at an angle $\alpha$ with respect to vertical and a bottom surface 236 angled at an angle $\beta$ with respect to vertical. This aspect of the present invention alters the acoustic properties of the air space 238 within the comb 232 and thereby affects the timbre of the sound produced. The angles $\alpha$ and $\beta$ can each be in the range of approximately 75 to 105 degrees.

Figure 24:
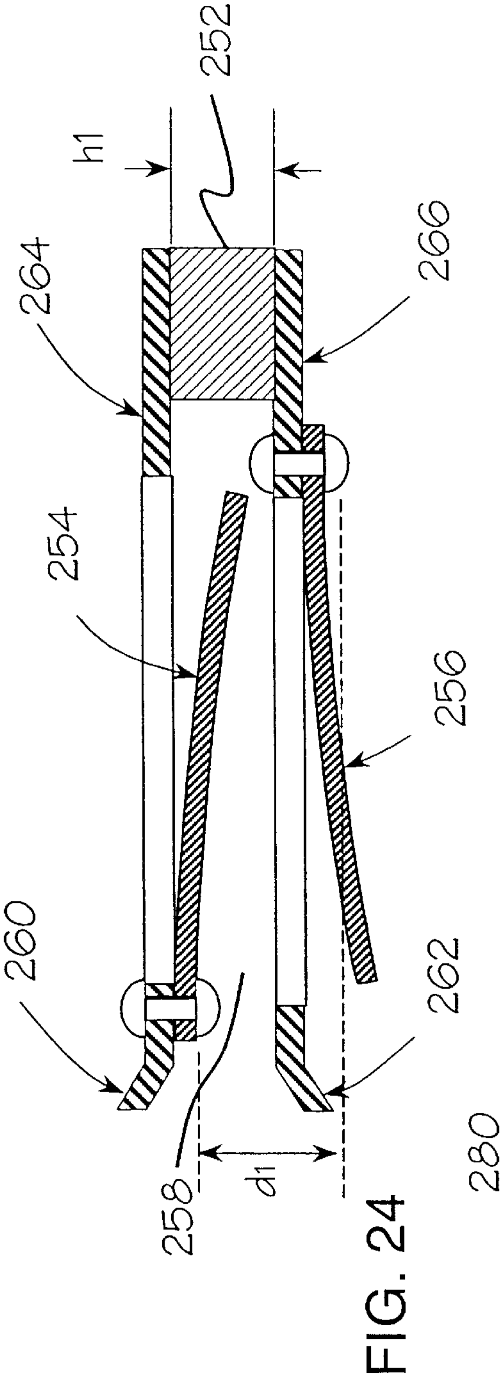
FIGS. 24 and 25 are sectional views of comb and reed plate embodiments of the present invention.

Referring now to FIG. 24, in another aspect of the present invention, the comb 252 of the harmonica can be reduced to a height $h_1$. The advantages of this configuration are twofold. First, the relatively close distance $d_1$ of the reeds 254,256 in the cell 258 improves their interaction during harmonica play. Accordingly, blow bends and draw bends are more readily performed by the harmonica player. This feature is particularly desirable on the first four and last four holes of a conventional ten-hole diatonic harmonica. Second, the volume of the cavity 258, being reduced from a typical volume, resists the player from reducing his/her mouth cavity to such a considerable degree than is conventionally needed for blow bending, overblowing, and overdrawing procedures. This feature is most desirably utilized on the last four holes of a conventional ten-hole diatonic harmonica. The height $h_1$ is preferably in the range of 3.5 to 4.5 mm or most preferably about 4.0 mm as compared to the typical height dimension of about 6.2 mm. In order to maintain a normal opening at the lips of the player, outward flares 260,262 are provided, respectively, at the front edge of the reed plates 264,266.

Figure 25:
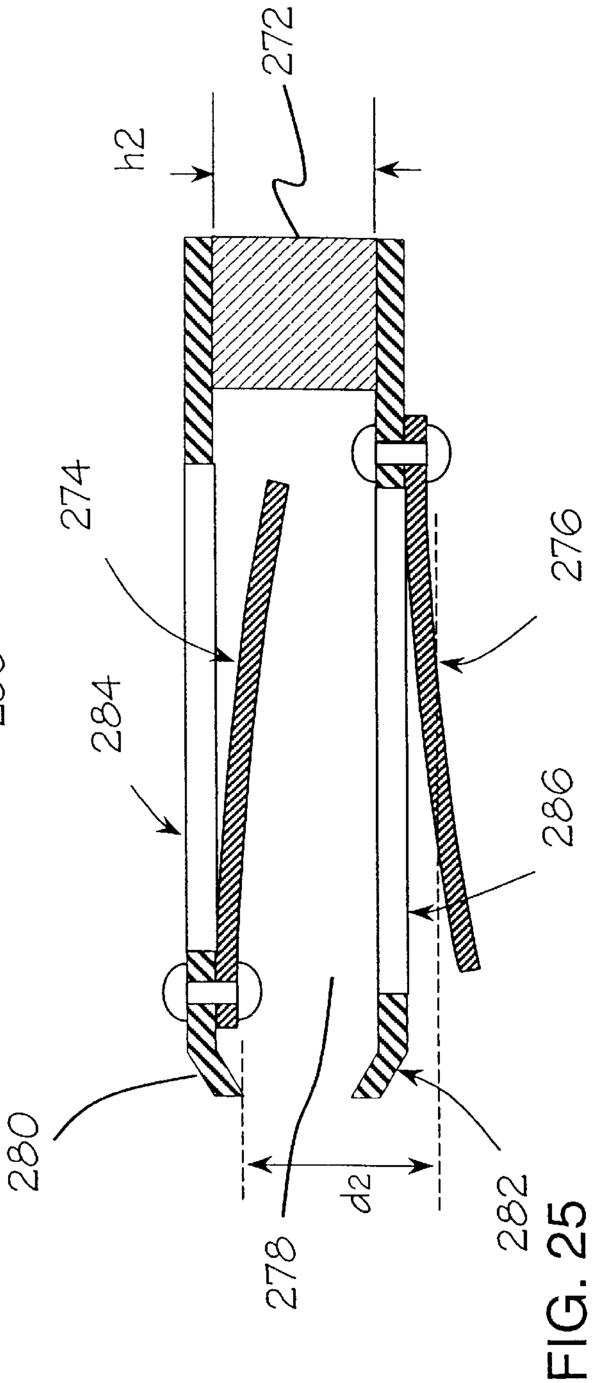

Referring now to FIG. 25, another aspect of the present invention is shown wherein the comb 272 is increased to a height $h_2$. The advantages of this configuration are twofold. First, the increased distance $d_2$ between the two reeds 274,276 in the cell 278 reduces their interaction. Accordingly, dissonant overblows and overdraws can be avoided. This feature is most desirable on the last seven holes of a ten-hole diatonic harmonica. Second, the volume of the cavity 278, being increased from its normal volume, resists the player from increasing his/her mouth cavity to a point greater than currently required for a draw bending procedure. This feature is most desirable on the first four holes of a diatonic harmonica. The height $h_2$ is preferably in the range of about 7.0 to 8.5 mm or most preferably 8.0 mm as compared to the typical height dimension of about 6.2 mm. To maintain a normal opening for the lips of the player (not shown), inward flares 280,282 are provided, respectively, at the front edge of the reed plates 284,286.

Figure 26:
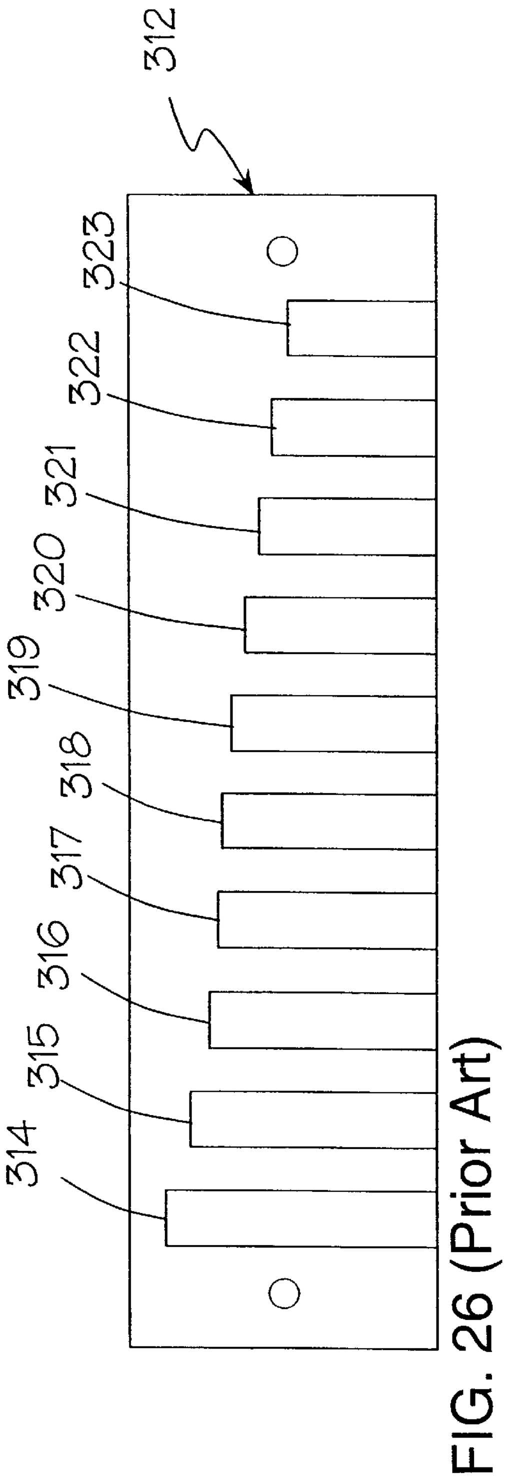
FIG. 26 (Prior Art)
FIG. 26 is a partially schematic top plan view of a conventional reed plate.
Figure 27:
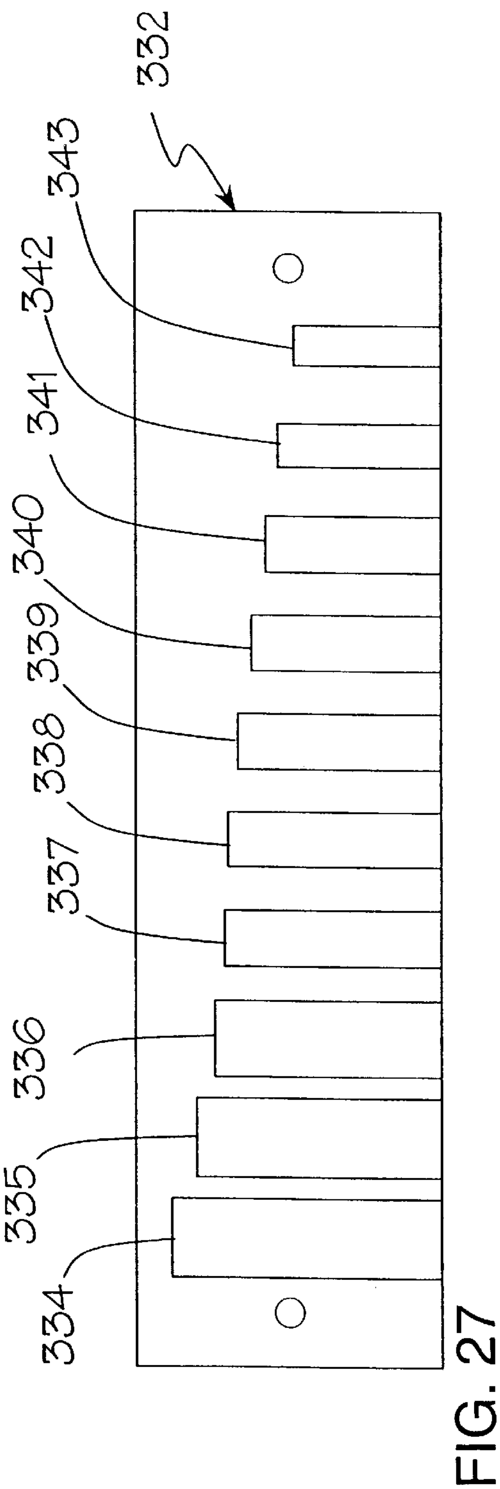
FIG. 27 is a partially schematic top plan view of a reed plate embodiment of the present invention.

Referring now to FIG. 26, a conventional comb 312 is shown having all cells of substantially the same width or approximately 4.2 mm. Referring next to FIG. 27, in accordance with an aspect of the present invention, the volume of each of the lower three cells 334,335,336 is increased and the volume of the upper two cells 342,343 is decreased by comparable enlargement or reduction of the widths of these cells. The range for the width of these cells with reduced or enlarged widths is preferably from about 3 mm to 6 mm.

Figure 28:
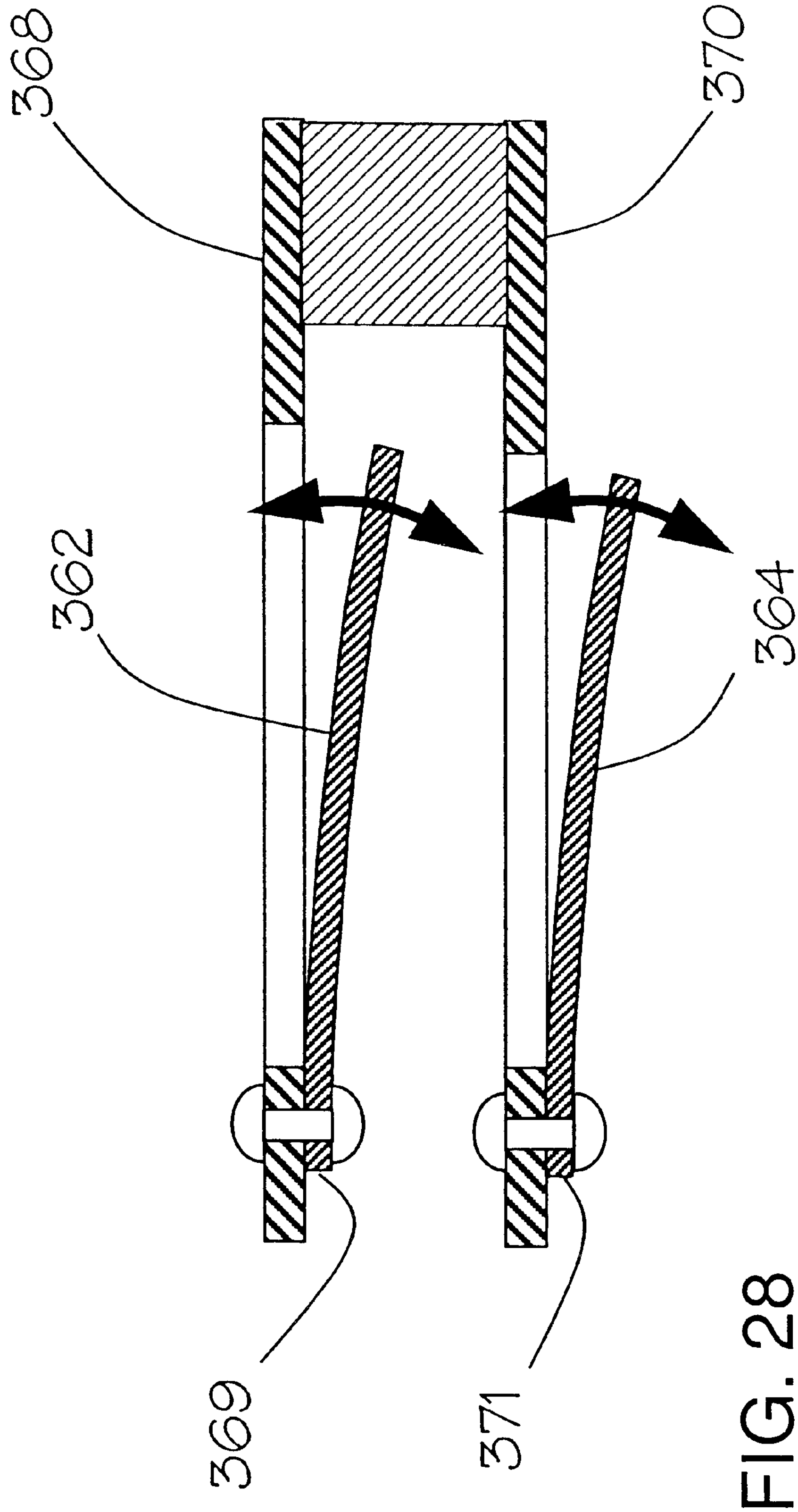
FIG. 28 is a sectional view of a reed embodiment of the present invention.

Referring now to FIG. 28, in another aspect of the present invention, the reeds 362,364 of the harmonica can be mounted on their respective reed plates 368,370 so that their respective roots 369, 371 are positioned in a substantially axial alignment with respect to each other. This provides the benefit of increasing the interaction between the reeds, thereby providing the improved play benefits previously described for other aspects of the present invention.

Figure 29:
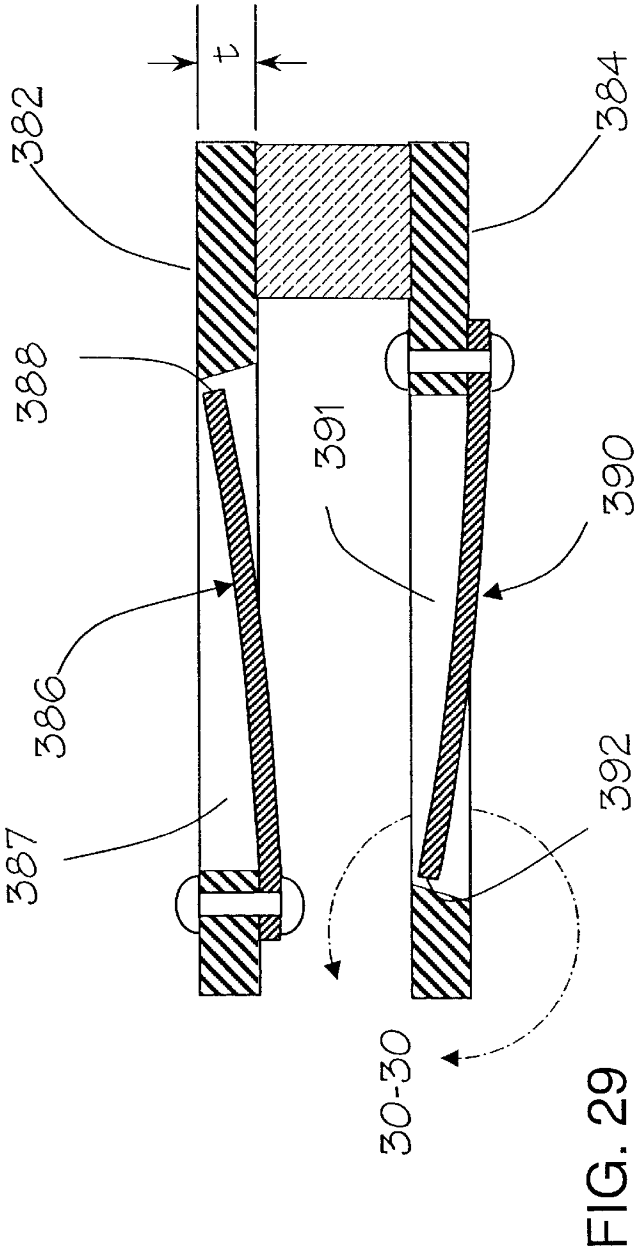
FIG. 29 is a sectional view of a reed plate embodiment of the present invention.
Figure 30:
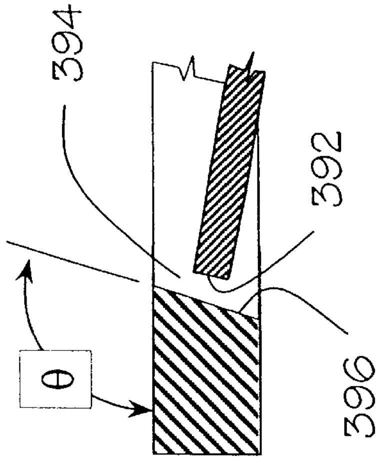
FIG. 30 is an enlarged sectional view taken at 30—30 of FIG. 29; and, FIG. 31 is a sectional view of a flexible member embodiment of the present invention.

Referring now to FIGS. 29 and 30, in another aspect of the present invention, the thickness t of the reed plate 382 can be in the range from about 1.5 to 2 mm. In contrast, a conventional harmonica has reed plates with thicknesses typically in the range of about 0.9 to 1.0 mm. This provides the advantage of increasing the amount of time the reed 386 spends within the slot 387, and thereby avoids leakage that occurs when the tip 388 of the reed 386 passes completely through the slot 387. FIG. 30 presents an enlarged view of section 30—30 of FIG. 29 that shows the detail of the reed plate 384 near the tip 392 of the reed 390. An additional feature of this reed plate 384 is a taper angle θ, corresponding to the arc of the reed 390 during its flexion. The inclusion of this taper angle θ also serves to reduce the leakage created by a gap 394 formed between the tip 392 of the reed 390 and the internal surface 396 of the reed slot 391, which gap 394 widens as the reed 390 flexes into the reed slot 391. The taper angle θ is typically in the range of approximately one to seven degrees.

Figure 31:
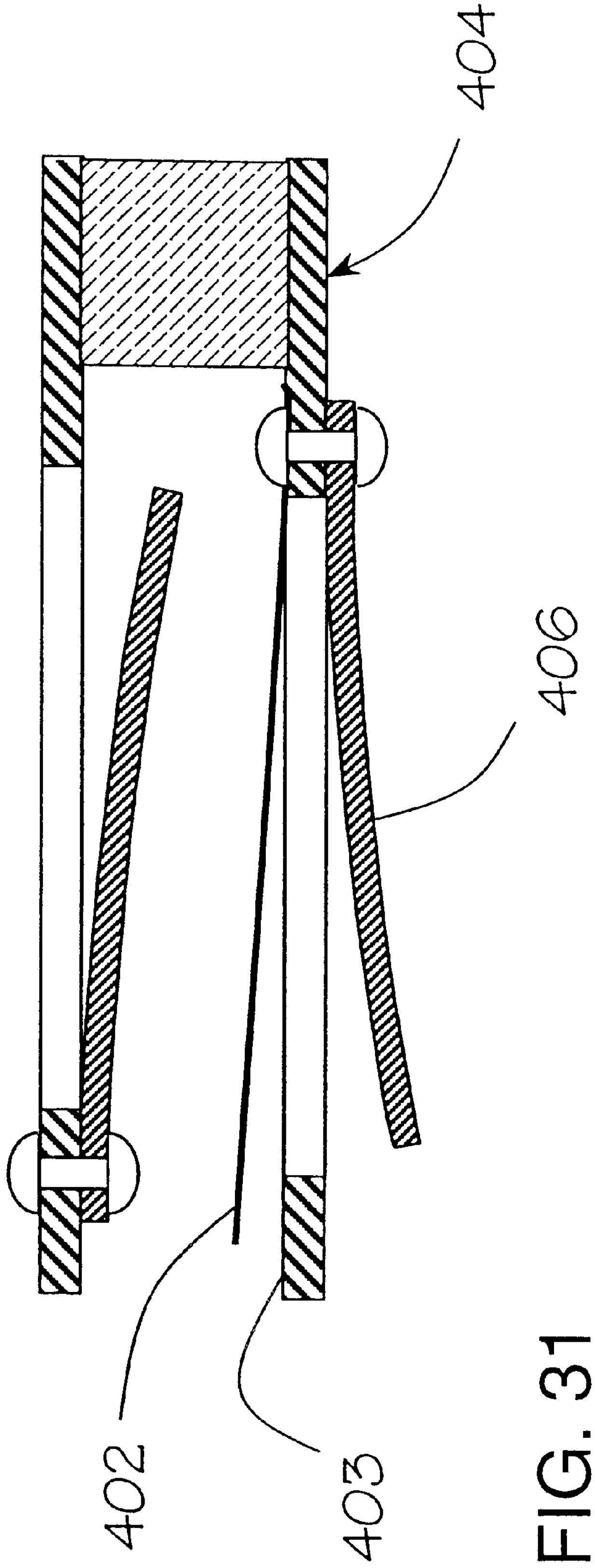

Referring now to FIG. 31, in another aspect of the present invention, a flexible member 402 is affixed at one end of the flexible member 402 to a surface 403 of the reed plate 404. The length and width of this member 402 are each slightly larger than the reed slot. Therefore, when air pressure is provided that causes the reed 406 to open, this normally resiliently biased member 402 is forced against the reed slot thereby substantially closing off air leakage. When air pressure is applied causing this reed 406 to close, the flexible member 402 is deflected from the source of air pressure, thereby not substantially affecting the function of the associated reed 406. This feature is beneficial for the draw reeds of the first three holes of a conventional diatonic harmonica, wherein excessive loss of air pressure is experienced when the player attempts to play a blow note, and also wherein overblows are not performed, thus the draw reed is not required to operate in the opening fashion. In the preferred embodiment, the flexible member is made from about 0.004" thick polyethylene, but any suitable material of equivalent thickness and stiffness may be used.

It can be appreciated that the improvements described herein need not be applied to all 20 reeds, but could be applied to only one reed, or some other reasonable combination of reeds of a harmonica.

Whereas certain terms of relative orientation such as "upper" and "lower" have been used herein to describe the invention, these terms are intended for purposes of illustration only and are not intended to limit the scope of the present invention. In addition, while specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A comb for a diatonic harmonica, said comb being substantially wedge-shaped and having a top surface sloped at a first angle with respect to vertical and bottom surface sloped at a second angle with respect to vertical, the top surface including a plurality of top reeds, the bottom surface including a plurality of bottom reeds, the comb being dimensioned and configured so that at least one of the top reeds acoustically interacts with a corresponding bottom reed.

2. The comb of claim 1, wherein said first angle is substantially equal to said second angle.

3. The comb of claim 1, wherein said first angle is in the range of 75° to 105° with respect to vertical.

4. The comb of claim 1, wherein said second angle is in the range of 75° to 105° with respect to vertical.

5. The comb for a diatonic harmonica according to claim 1 wherein one of the top reeds and one of the bottom reeds define a distance therebetween, the distance being within a range of about 3.5 mm to about 4.5 mm.

6. The comb according to claim 5, wherein one of the top reeds and one of the bottom reeds define a distance therebetween, the distance being in a range of about 7.0 mm to about 8.5 mm.

7. The comb according to claim 1, wherein one of the top reeds and one of the bottom reeds define a distance therebetween, the distance being in a range of about 7.0 mm to about 8.5 mm.

8. A diatonic harmonica, comprising:

a wedge-shaped comb having a top surface sloped at a first angle with respect to vertical and a bottom surface sloped at a second angle with respect to vertical;

a plurality of top reeds within the top surface;

a plurality of bottom reeds within the bottom surface;

a plurality of cells defined within the harmonica, each cell having a corresponding top reed and a corresponding bottom reed, one of said top reed and bottom reed being a blow reed, and the other of said top reed and bottom reed being a draw reed; and the harmonica being dimensioned and configured so that, within at least one of the cells, the blow reed and draw reed corresponding to the at least one cell acoustically interact with each other.

9. The harmonica of claim 8, wherein said first angle is substantially equal to said second angle.

10. The harmonica of claim 8, wherein said first angle is in the range of 75° to 105° with respect to vertical.

11. The harmonica of claim 8, wherein said second angle is in the range of 75° to 105° with respect to vertical.

12. The harmonica for a diatonic harmonica according to claim 8, wherein the top surface and bottom surface define a distance therebetween, the distance being within a range of about 3.5 mm to about 4.5 mm.

13. The harmonica according to claim 12, wherein one of the top reeds and one of the bottom reeds define a distance therebetween, the distance being in a range of about 7.0 to about 8.5 mm.

14. The harmonica according to claim 8, wherein one of the top reeds and one of the bottom reeds define a distance therebetween, the distance being in a range of about 7.0 mm to about 8.5 mm.

* * * * *